(12) United States Patent
Venkataraman et al.

(10) Patent No.: US 11,490,429 B2
(45) Date of Patent: Nov. 1, 2022

(54) COMPANION ASSISTANCE AND EFFICIENT LINK SELECTION FOR WEARABLE DEVICES

(71) Applicant: Apple Inc., Cupertino, CA (US)

(72) Inventors: Vijay Venkataraman, Sunnyvale, CA (US); Ajoy K. Singh, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 428 days.

(21) Appl. No.: 15/927,973

(22) Filed: Mar. 21, 2018

(65) Prior Publication Data

US 2019/0254085 A1 Aug. 15, 2019

Related U.S. Application Data

(60) Provisional application No. 62/629,792, filed on Feb. 13, 2018.

(51) Int. Cl.
*H04W 76/10* (2018.01)
*H04W 52/02* (2009.01)
*H04W 4/80* (2018.01)

(52) U.S. Cl.
CPC ............ *H04W 76/10* (2018.02); *H04W 4/80* (2018.02); *H04W 52/0209* (2013.01)

(58) Field of Classification Search
CPC ................................ H04W 76/10; H04W 4/80
See application file for complete search history.

(56) References Cited

U.S. PATENT DOCUMENTS

| | | | |
|---|---|---|---|
| 9,137,849 B1* | 9/2015 | Wright | ............... H04W 88/026 |
| 9,602,999 B2 | 3/2017 | Kim | |
| 9,668,044 B2 | 5/2017 | Schobel | |
| 9,690,465 B2 | 6/2017 | Tuck | |
| 9,712,657 B2 | 7/2017 | De Filippis | |
| 9,729,687 B2 | 8/2017 | Hsieh | |
| 2004/0203787 A1* | 10/2004 | Naghian | ............... H04W 36/08 455/437 |
| 2008/0232299 A1* | 9/2008 | Mosig | ................... H04W 48/18 370/328 |
| 2011/0053523 A1* | 3/2011 | Yeh | ........................ H04B 1/406 455/73 |
| 2012/0244814 A1* | 9/2012 | Okayasu | ............ H04M 1/6066 455/41.3 |
| 2012/0315900 A1 | 12/2012 | Wen | |
| 2013/0005353 A1* | 1/2013 | Traynor | ............ H04W 52/0254 455/456.1 |

(Continued)

OTHER PUBLICATIONS

First Office Action for CN Patent Application No. 201910111927.5, dated Jun. 28, 2021, 8 pages.

*Primary Examiner* — Wen W Huang
(74) *Attorney, Agent, or Firm* — Kowert, Hood, Munyon, Rankin & Goetzel, P.C.

(57) ABSTRACT

This disclosure relates to transport link selection for an accessory wireless device in association with a companion device. The accessory device may communicate via a short range wireless communication link with the companion device. The companion device may detect an event and, based on the event, transmit assistance information to the accessory device. The accessory device may evaluate various conditions. The accessory device may select a transport link and/or short range link based at least in part on the received assistance information and/or the evaluated conditions.

24 Claims, 13 Drawing Sheets

(56) References Cited

U.S. PATENT DOCUMENTS

| | | |
|---|---|---|
| 2013/0072116 A1 | 3/2013 | Song |
| 2014/0003342 A1* | 1/2014 | Sheriff ................ H04W 36/24 370/328 |
| 2014/0106677 A1 | 4/2014 | Altman |
| 2014/0235167 A1 | 8/2014 | Jung |
| 2015/0031295 A1* | 1/2015 | Holman ................ H04W 76/10 455/41.2 |
| 2015/0245186 A1 | 8/2015 | Park et al. |
| 2015/0334657 A1 | 11/2015 | Newham |
| 2016/0191093 A1 | 6/2016 | Larsen |
| 2016/0198319 A1 | 7/2016 | Huang et al. |
| 2016/0255662 A1* | 9/2016 | Kotecha ................ H04W 76/10 370/254 |
| 2016/0278007 A1* | 9/2016 | Gokhale ................ H04W 76/10 |
| 2017/0055195 A1* | 2/2017 | Ingale ................ H04W 36/22 |
| 2017/0078837 A1 | 3/2017 | Liang |
| 2018/0041811 A1 | 2/2018 | Lee |
| 2018/0092007 A1 | 3/2018 | Ekici |
| 2018/0240096 A1 | 8/2018 | Patel |
| 2019/0053114 A1 | 2/2019 | Karimli |
| 2019/0082365 A1 | 3/2019 | Van Oost |

\* cited by examiner

COMPANION ASSISTANCE AND EFFICIENT LINK SELECTION FOR WEARABLE DEVICES

PRIORITY CLAIM

This application claims priority to U.S. provisional patent application Ser. No. 62/629,792, entitled "Companion Assistance for Efficient Transport Link Selection for Wearable Devices," filed Feb. 13, 2018, which is hereby incorporated by reference in its entirety as though fully and completely set forth herein.

TECHNICAL FIELD

The present application relates to wireless communication, including to techniques for a wireless device to select a transport link based at least in part on assistance from a companion device.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets. Wearable devices may operate in association with a companion device. For example, a wearable device may operate in a relay mode by using a short range link with the companion device in combination with a cellular or Wi-Fi link of the companion device to transport data for the wearable device. Lack of information about a remote link and false positives (e.g., switches from one short range link to another in response to short term fluctuations in conditions) may result in unnecessary energy use and/or poor performance of the accessory device. Therefore, improvements in the field are desired.

SUMMARY

Embodiments are presented herein of, inter alia, systems, apparatuses, and methods for a wireless device to select a transport link based at least in part on assistance from a companion device.

The wireless device may be a link budget limited device, such as an accessory device (e.g., a wearable device) with a relatively limited battery power capacity, e.g., due to device design constraints. Because of the relatively limited battery power capacity of the wireless device, avoiding excessive power use for transport link operations may be a priority.

While operating in a relay mode, an accessory device may not have direct information about events which may impact a remote link, according to some embodiments. Such events may increase or decrease the performance of a remote link used by the accessory device in a relay mode. As a result of the lack of direct information, the accessory device may not be able to rapidly select a superior transport link following such an event, which may result in suboptimal performance, user experience, and/or energy use of the accessory device.

In some embodiments, the wireless device may receive information from a companion device and may use this information for selection of a transport link. The wireless device may also gather and use additional information for link selection. Based on the information, the wireless device may select a transport link.

Additionally, or alternatively, the wireless device may evaluate one or more conditions to select a short range link. The conditions may be related to an active first short range link and/or alternative short range link, among various possibilities.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
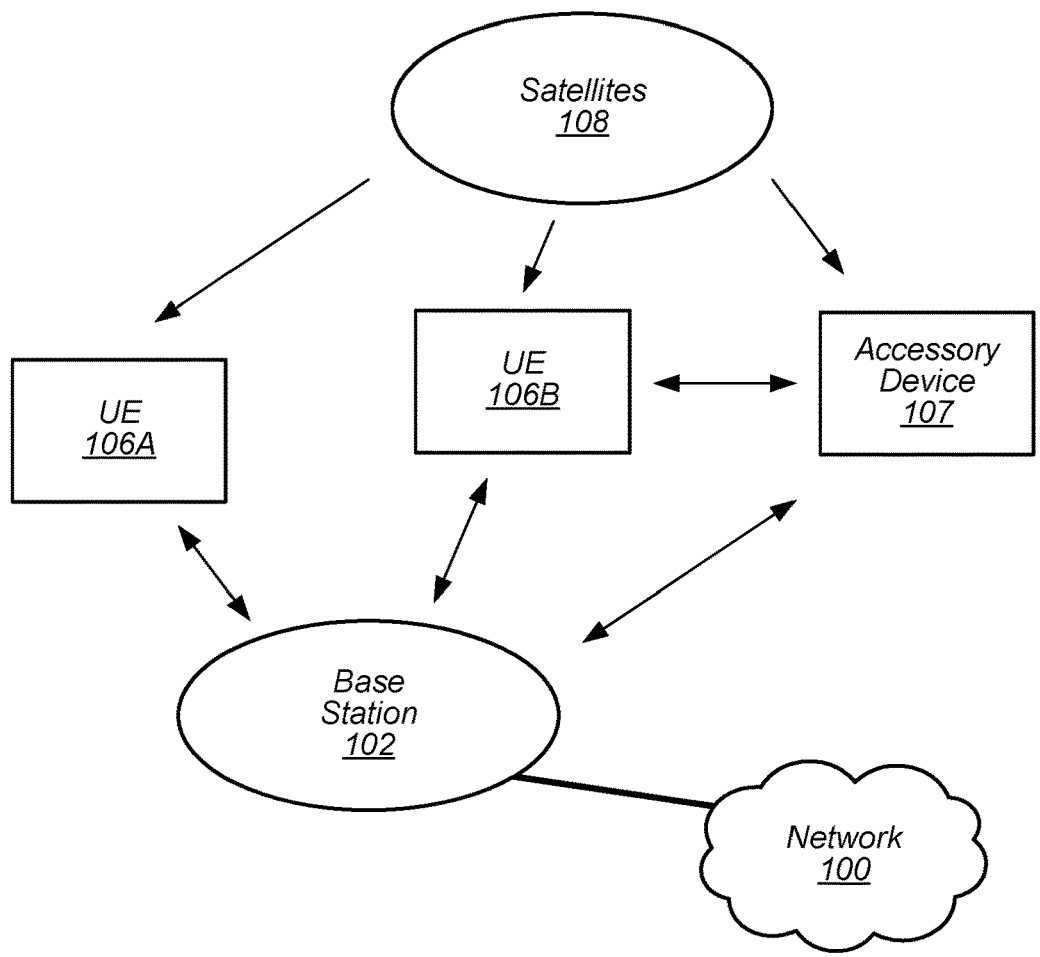
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally inherently link budget limited devices. Alternatively, a device (e.g., a smart phone) may not be inherently link budget limited, e.g., it may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device, e.g., a device with a small/limited battery may be an inherently link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke interpretation under 35 U.S.C. § 112(f) for that component.

FIG. 1—Wireless Communication System

FIG. 1 illustrates an example of a wireless communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more wireless local area network (WLAN) protocols, such as IEEE 802.11 a, b, g, n, ac, ad, and/or ax (e.g., Wi-Fi, collectively), or LTE in an unlicensed band (LAA). In some embodiments, a separate access point (not shown) may provide a WLAN, and the UEs 106/107 may communicate with such an access point. Thus, BS 102, may be a base station (e.g., a cellular base station), a WLAN access point, or both a base station and access point.

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

As further shown, the exemplary wireless communication system includes multiple satellites 108, which may provide wireless (e.g., RF, microwave) signals to one or more wireless devices 106A, 106B, etc., as well as accessory device 107. The wireless signals from the satellites 108 may allow any or all of the UEs 106/107 that are so configured to determine their location information, e.g., in accordance with one or more global navigational satellite system (GNSS, e.g., GPS, GLONASS, Galileo, Beidou) technologies. For example, one of the UEs 106/107 might triangulate the longitude, latitude, and/or altitude/elevation of the device based on time indications from the set of satellites 108 within communication range of the device.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, NR, WLAN, Bluetooth, one or more GNSS technologies, one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. The UE 106B may be configured to communicate with the UE device 107, which may be referred to as an accessory device 107, while the UE 106B associated with the accessory device 107 may be referred to as a companion device to the accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or WLAN.

The accessory device 107 includes cellular communication capability and hence is able to directly communicate with cellular base station 102. The accessory device 107 further includes GNSS communication capability and hence is able to directly determine accurate location information for the accessory device 107 based on signals received from the satellites 108. However, since the accessory device 107 is possibly one or more of communication, output power and/or battery limited, the accessory device 107 may in some instances selectively utilize the UE 106B as a proxy for communication purposes with the base station 102 and hence to the network 100, and/or for location determination purposes with satellites 108. In other words, the accessory device 107 may selectively use the cellular and/or GNSS communication capabilities of its companion device (e.g., UE 106B) to conduct its cellular and/or GNSS communications. The limitation on communication abilities of the accessory device 107 (e.g., relative to a companion device, e.g., UE 106B) may be permanent and/or inherent, e.g., due to limitations in output power or the radio access technologies (RATs) supported. An accessory device 107 may be inherently link budget limited. In other words, aside from variable factors (e.g., current conditions such as interference, distance from a base station, etc.), the communication capability of an accessory device may generally be lower than that of a companion device 106. However, due to variability in such current conditions, the capability of a companion device and accessory device may vary. Under most conditions, an accessory device 107 may have more communication limitations than UE 106.

Figure 2:
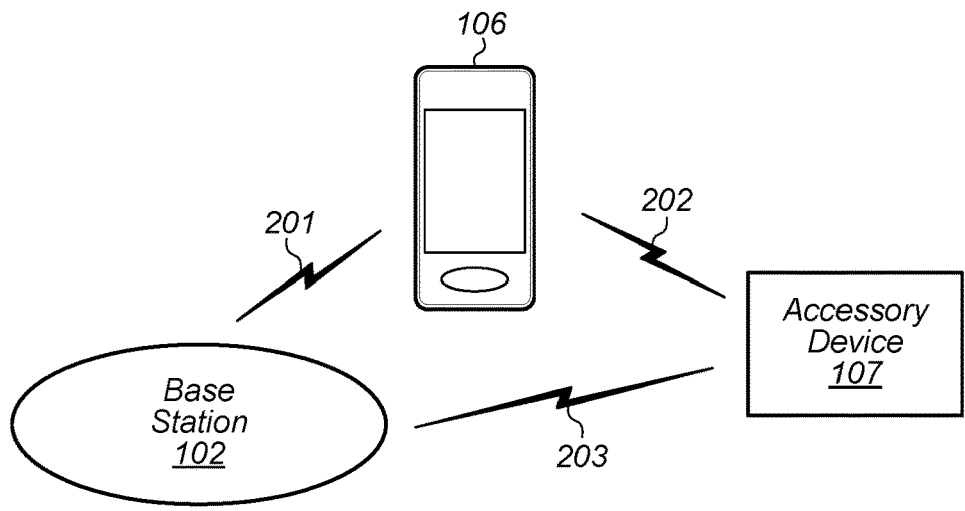
FIG. 2 illustrates an example system where an accessory device can selectively either directly communicate with a cellular base station or utilize the cellular capabilities of an intermediate or proxy device such as a smart phone, according to some embodiments.

FIG. 2 illustrates an example accessory device 107 in communication with base station 102 (e.g., which may also be or include an access point) and companion device 106, according to some embodiments. The accessory device 107 may be a wearable device such as a smart watch. The accessory device 107 may comprise cellular communication capability and be capable of directly communicating with the base station 102 as shown. The accessory device 107 may also have GNSS communication capability and be capable of directly communicating with satellites 108. When the accessory device 107 is configured to directly communicate with the base station (e.g., via "direct" link 203), the accessory device may be said to be in "autonomous mode" or "standalone mode". Link 203 may operate according to cellular or WLAN technology. A link 203 using WLAN may be termed a "direct Wi-Fi" or "direct WLAN" link.

The accessory device 107 may also be capable of communicating with another device (e.g., UE 106), referred to as a proxy device, intermediate device, or companion device, using a short range communications protocol (link 202); for example, the accessory device 107 may, according to some embodiments, be "paired" with the UE 106. The short range link 202 may use Bluetooth or WLAN, according to some embodiments. A short range link 202 using WLAN may include an access point (not shown), e.g., as an intermediary. Under some circumstances, the accessory device 107 may use the cellular or WLAN link (201, which may be referred to as a "remote" link) of this proxy device for communicating cellular voice/data with the base station 102. For example, the accessory device 107 may provide voice/data packets intended for the base station 102 over the short range link 202 to the UE 106, and the UE 106 may use its cellular/WLAN functionality to transmit (or relay) this voice/data to the base station on behalf of the accessory device 107 using link 201. Similarly, the voice/data packets transmitted by the base station 102 and intended for the accessory device 107 may be received by the cellular/WLAN functionality of the UE 106 and then may be relayed over the short range link 202 to the accessory device. As a further example, the timing signals provided by the satellites 108 may be received by the UE 106 and used to determine the location of the UE 106, which may then relay the location information to the accessory device 107. Note that such location information may serve as approximate location information for the accessory device 107, e.g., as the accessory device 107 may be sufficiently close to the UE 106 to perform short range wireless communication, but may not be as accurate as location information obtained when the accessory device 107 utilizes its own GNSS functionality. As noted above, the UE 106 may be a mobile phone, a tablet, or any other type of handheld device, a media player, a computer, a laptop or virtually any type of wireless device. When the accessory device 107 is configured to indirectly communicate with the base station using the cellular functionality of an intermediate or proxy device (e.g., using links 201 and 202), the accessory device may be said to be in "relay mode."

The UE 106 and/or 107 may include a device or integrated circuit for facilitating cellular communication, referred to as a cellular modem. According to some embodiments, the cellular modem may also include GNSS functionality integrated into the cellular modem, though the GNSS functionality may be provided separately if desired. The cellular modem may include one or more processors (processor elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106 or 107 might be configured to communicate using a single shared radio. The shared radio may couple to a single antenna, or may couple to multiple antennas (e.g., for MIMO) for performing wireless communications. Alternatively, the UE device 106 or 107 may include two or more radios. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with WLAN (e.g., Wi-Fi) capabilities (and possibly limited cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. As previously noted, when the UE 106 is capable of being used by the accessory device 107 as a proxy, the UE 106 may be referred to as a companion device to the accessory device 107.

Figure 3:
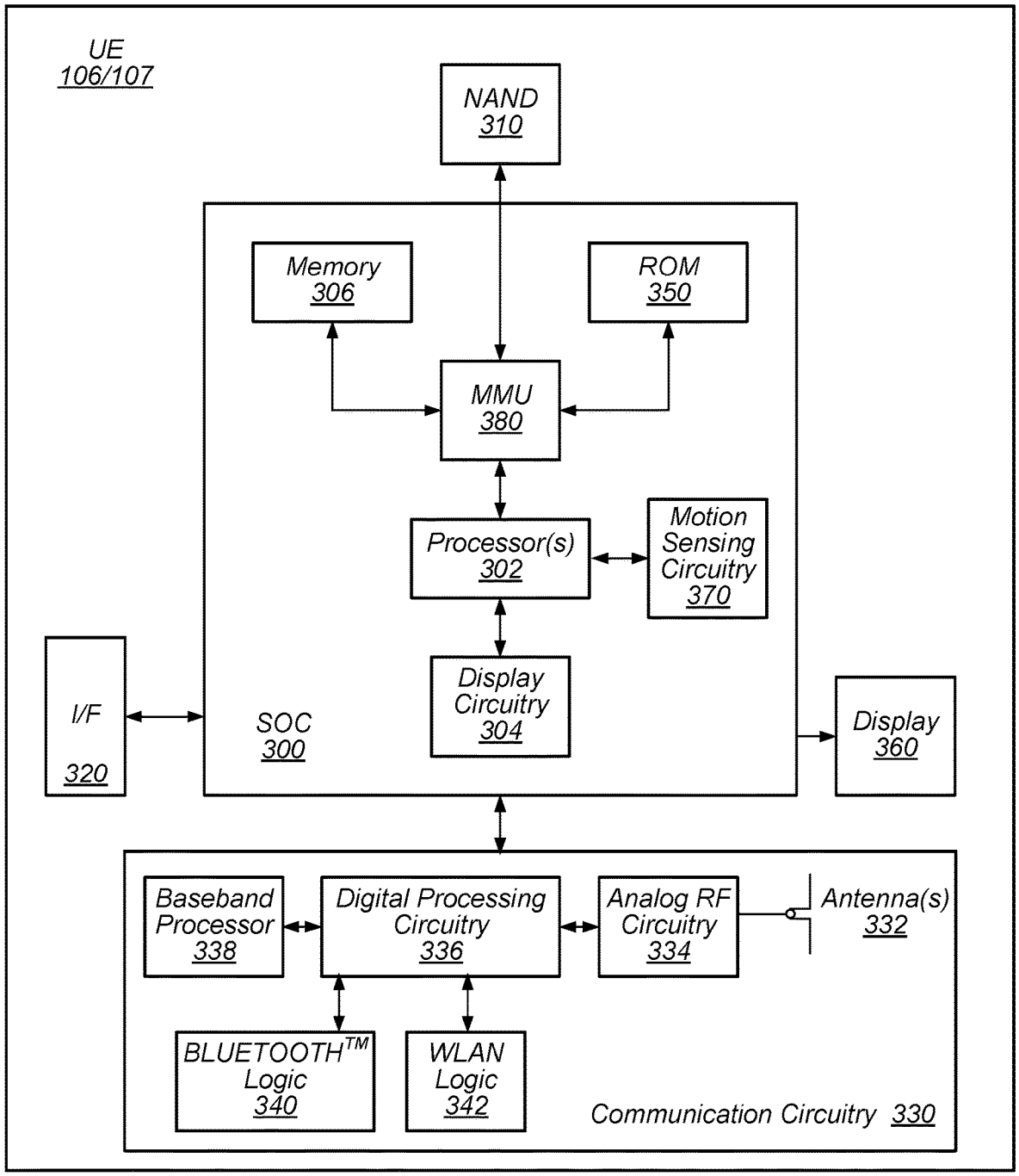
FIG. 3 is a block diagram illustrating an example wireless device, according to some embodiments.

FIG. 3—Example Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 380, which may be configured to receive addresses from the processor(s) 302 and translate those addresses to locations in memory (e.g., memory 306, read only memory (ROM) 350, flash memory 310). The MMU 380 may be configured to perform memory protection and page table translation or set up. In some embodiments, the MMU 380 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas (e.g., 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless device 106/107 may include communication circuitry 330, for performing wireless communication with base stations and/or other devices. UE device 106/107 may perform communications with base stations and other devices implementing different wireless technologies in some embodiments. The communication circuitry 330 may include one or more antenna 332, analog RF signal processing circuitry 334, digital processing circuitry 336, a baseband processor 338, Bluetooth logic 340, and WLAN logic 342. According to some embodiments, baseband processor 338 may have GPS and/or other GNSS functionality co-located on the same integrated circuit (e.g., chip), as shown, though it should be noted that this functionality may be provided separately if desired. Further, Bluetooth logic 340 may enable the wireless device 106/107 to perform Bluetooth communications. Similarly, WLAN logic 342 may enable the UE device 106/107 to perform WLAN communications (e.g., Wi-Fi communications on an 802.11 network). According to some embodiments, baseband processor 338, Bluetooth logic 340, and WLAN logic 342 may share digital processing circuitry 336 and/or analog RF circuitry 334. According to other embodiments, baseband processor 338, Bluetooth logic 340, and WLAN logic 342 may not share digital processing circuitry 336 and/or analog RF circuitry 334, e.g., the different radio access technologies may have independent digital and/or analog circuitry and/or antennas.

The communication circuitry 330 may be powered or depowered. Note that the term depowered as used herein may include a variety of possible states, including low power states, fully depowered states, sleep states, etc. The term powered as used herein may include a fully powered state, or a normal operational receive state. Additionally, the communication circuitry 330 may be configured so that individual elements/components may be separately powered or depowered. For example, in some embodiments, it may be possible to depower analog RF circuitry 334 without affecting digital processing circuitry 336 or baseband processor 338.

For example, the UE device 106 may use antenna(s) 332 to perform the wireless communication. As noted above, the UE may in some embodiments be configured to communicate wirelessly using a plurality of wireless communication standards or radio access technologies (RATs).

As described herein, wireless device 106/107 may include hardware and software components for implementing embodiments of this disclosure. The wireless device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
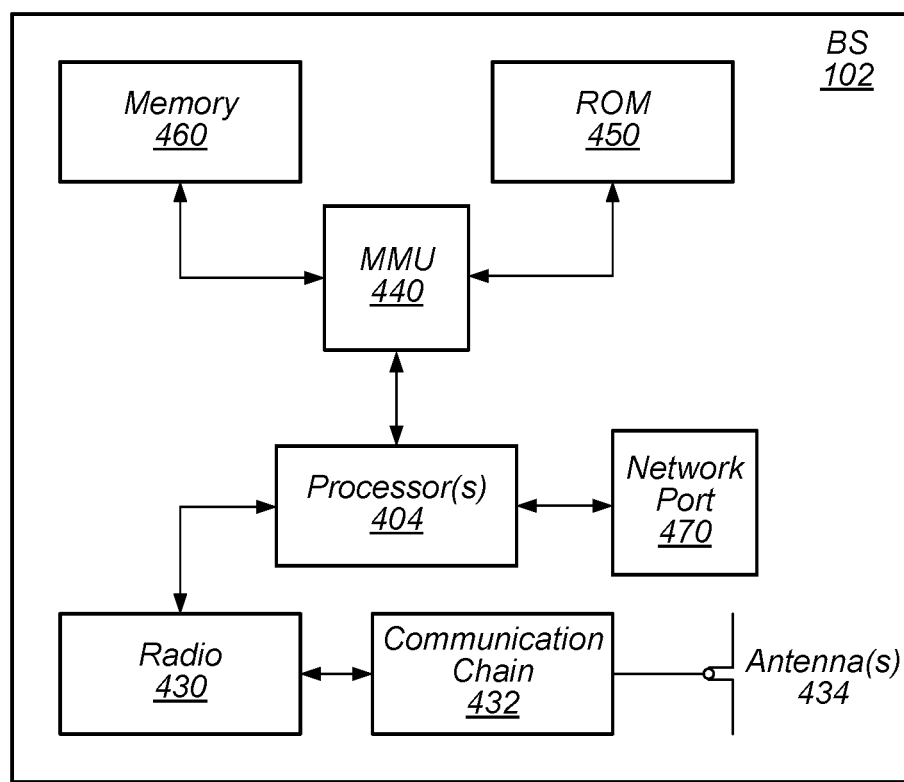
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
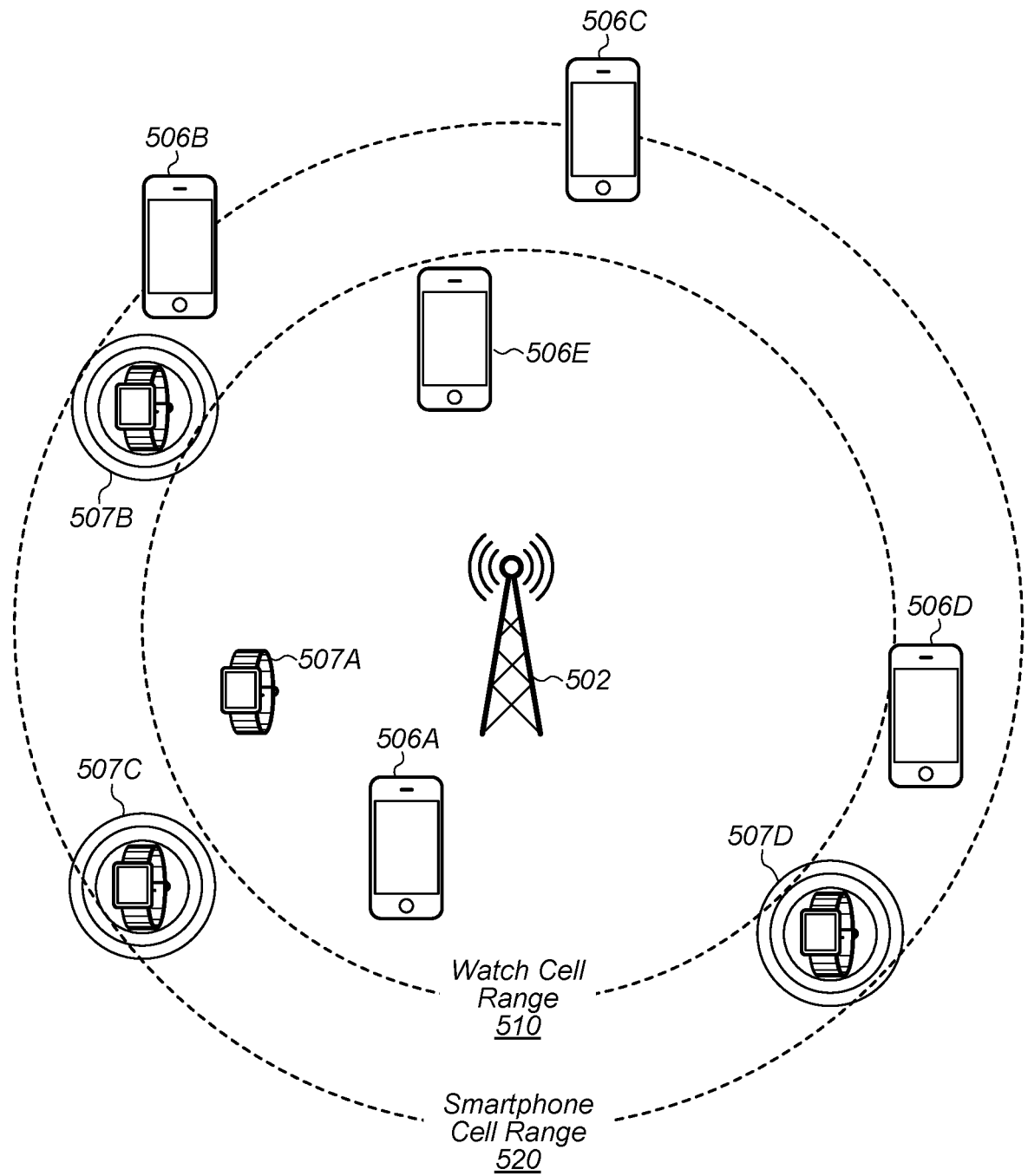
FIG. 5 illustrates a possible example coverage scenario for smartphones and smart watches, according to some embodiments.

FIG. 5—Example Coverage Range

As noted above, a wireless device may be an inherently link budget limited device, such as an accessory device with a relatively limited communication range, e.g., due to device design constraints (e.g., hardware limitations). Because of the relatively limited communication range of the wireless device, cellular communication service coverage for the accessory device may not be as widespread as for many other wireless devices, which may in turn result in the accessory device experiencing less cellular communication capabilities than a wireless device with greater communication range.

FIG. 5 illustrates one possible example of a coverage scenario for smartphones (an exemplary companion device) and smart watches (an exemplary accessory device), according to some embodiments. As shown, a base station 502 may provide a cell for a variety of wireless devices, including various smartphones 506 and various smart watches 507. As previously discussed, such different types of devices may have differing characteristics that result in different effective communication ranges. Thus, as shown, the effective watch cell range 510 may be smaller than the effective smartphone cell range 520. As a result, while all of the illustrated smartphones (506A, 506B, 506C, 506D, 506E) may have good communication quality with the base station 502, only one of the illustrated smart watches (507A) may enjoy similar communication quality, and the remainder of the illustrated smart watches (507B, 507C, 507D) may have lower communication quality (e.g., and may be outside of communicative range of the base station 502).

In view of the potentially more limited communication range/capability of an accessory device (e.g., a smart watch 507) in comparison to its companion device (e.g., a smartphone 506), it may commonly be preferred to utilize a short range link with a companion device for communications when such a link is available. Considering the potentially more limited battery capacity of an accessory device, it may further be helpful to dynamically manage the baseband operation of an accessory device, e.g., to limit battery consumption during times when full baseband operation is not necessary (and potentially not optimal), such as when a short range link with a companion device can support any desired communication needs of the accessory device at a lower power cost than by the accessory device autonomously using its own baseband communication capabilities.

However, under some circumstances a companion device may not be able to provide adequate communications (e.g., using a short range link) for one or more applications of an accessory device. Under such circumstances, it may be beneficial for an accessory device to select a transport link that may be able to provide better communication with a network.

It should be noted that while the above is described as being directed to accessory devices or link budget limited devices, such techniques may also be beneficial to non-link budget limited wireless devices (e.g., including wireless devices with larger cellular communication ranges, such as the smartphones illustrated in FIG. 5), and may also or alternatively be used in conjunction with such devices if desired.

Figure 6:
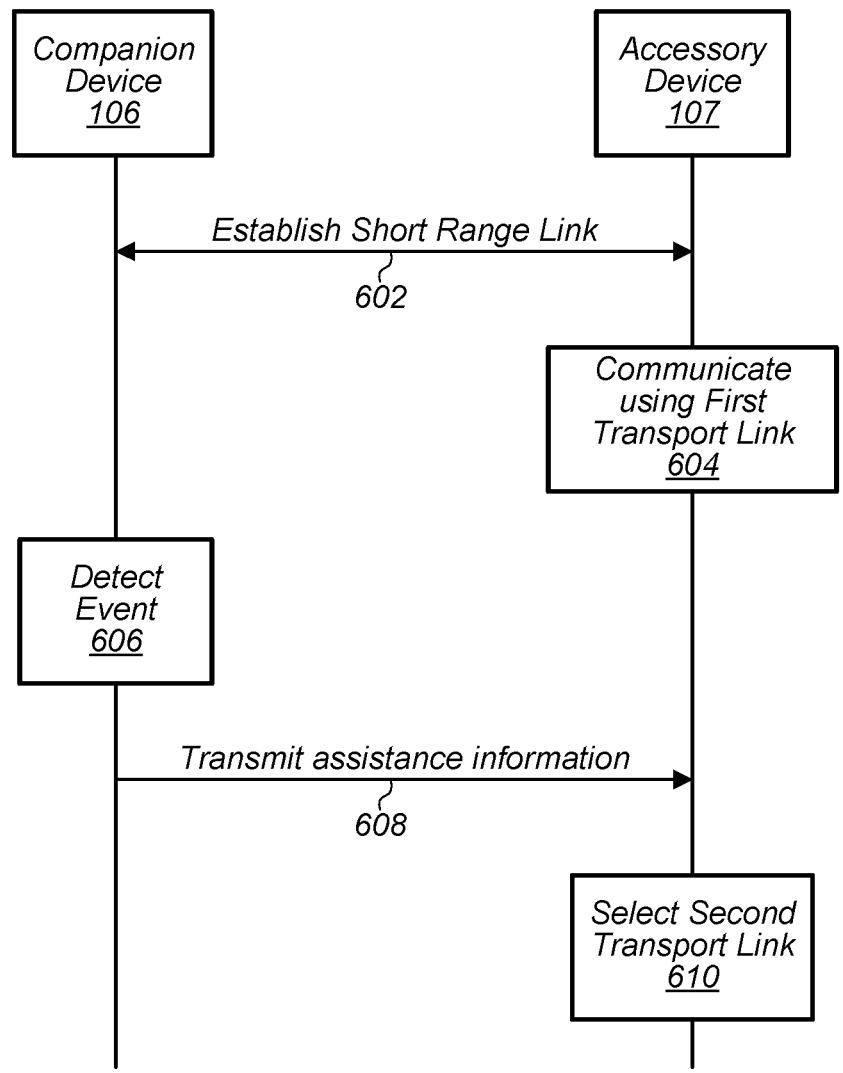
FIG. 6 is a communication flow diagram illustrating an exemplary method for a wireless device to dynamically manage its baseband operations, according to some embodiments.

FIG. 6—Communication Flow Diagram

In wireless devices, particularly accessory or wearable devices, maximizing battery life, given the small form factor and, thus limited battery capacity, is an important consideration. However, providing good user experience to the user of an accessory device is also an important consideration. As conditions change over time (e.g., due to motion of one or both of the accessory device or companion device, changing radio link conditions, etc.), the relative importance of these considerations may vary. Providing assistance information from a companion device 106 to an accessory device 107 based on events (or more generally based on changing conditions) is one possible technique to improve user experience and/or improve battery life of these devices.

There may be a variety of possible transport link options for an accessory device 107 to use for communication with a network. Briefly, such options may include at least: 1) a Bluetooth connection with companion device 106, which may in turn connect to (and provide data to and from) a network 100; 2) a WLAN connection with companion device 106, which may in turn connect to (and provide data to and from) a network 100; 3) a direct WLAN connection with a network 100; and 4) a direct cellular connection with a network 100. Of these options, a Bluetooth link may be most power efficient for accessory device 107. Conversely, a cellular link may be least power efficient for accessory device 107. A direct WLAN connection may offer low latency, e.g., in comparison to the other possible links available to the accessory device.

Assistance information from companion device 106 may be useable by accessory device 107 to select a transport link. For example, an accessory device 107 using a Bluetooth connection with companion device 106 to communicate with a network 100 may not be directly informed about upcoming changes in the connection between companion device 106 and network 100 which may impact the ability of accessory device 107 to provide a good user experience. Assistance information from companion device 106 may allow accessory device 107 to prepare for upcoming changes, e.g., by changing transport links in a timely manner, thus providing an improved user experience and/or improved battery life. Absent the assistance information, and more generally absent the techniques disclosed herein, such an accessory device 107 may select a transport link based primarily on the quality of a short range link (e.g., the Bluetooth connection with companion device 106) without consideration of the quality (e.g., or availability) of the remote link between companion device 106 and network 100. Thus, in one example, accessory device 107 may attempt to rely on a high-quality Bluetooth connection with companion device 106 to provide data for an application executing on the accessory device 107 even though companion device 106 may not have an active link to network 100 capable of providing the data with sufficient performance to meet the requirements of the application. According to the techniques disclosed herein, the companion device 106 may provide assistance information to accessory device 107 to enable the accessory device 107 to select a transport link based at least in part on information about the link between companion device 106 and network 100.

FIG. 6 is a communication flow diagram illustrating one such method for an accessory device in communication with a companion device, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 6 may be implemented by devices, such as a UE 106 and accessory device 107 illustrated in and described with respect to FIGS. 1-3, or more generally in conjunction with any of the computer systems or devices shown in the Figures, among other devices, as desired. As shown, the method may operate as follows.

In 602, companion device 106 and accessory device 107 may establish a short range link. The short range link may use a short range communication protocol, such as Bluetooth or WLAN (e.g., 802.11/Wi-Fi) to connect the two devices (e.g., companion device 106 and accessory device 107). According to some embodiments, a WLAN short range link may include a base station or access point as an intermediary, e.g., accessory device 107 may communicate via WLAN with a base station which may in turn communicate with companion device 106 via WLAN. The two devices may be said to be "paired" or "connected" via the short range link. As illustrated in FIG. 2 and described above, the short range link may be link 202.

The short range link may change over time, e.g., from a first short range link using a first short range communication protocol to a second short range link using a second short range communication protocol, e.g., in response to changing conditions and/or changing communication requirements. For example, the short range link used by the accessory device may transition from Bluetooth to WLAN (or vice versa) as needed (e.g., any number of times) to accommodate communication requirements of one or more applications executing on the devices. Power use of the short range communication protocols may be one factor considered by either or both of the devices to select a protocol for the short range link. Thus, the switching of the short range link used by the accessory device may be based on any number of factors, including communication quality, power use of the respective communication technology (e.g., RAT), battery condition of the accessory device and/or companion device, amount or type of data to be transmitted, etc.

Accessory device 107 may be configured to establish the short range link with companion device 106 at any time that the two devices are within proximity of each other, e.g., in range of the communication protocol of the short range link. This link establishment (and/or maintenance) may be performed dynamically, e.g., as one is needed, or, alternatively, whenever one is available or possible. Accessory device 107 may exchange data (e.g., payload data and/or control data) with companion device 106 at any time after the short range link is established.

In 604, the accessory device 107 may communicate using a first transport link. The first transport link may or may not include the short range link of 602. For example, in some embodiments (e.g., or under some circumstances), the first transport link may include the short range link (e.g., between devices 106 and 107 using Bluetooth or WLAN) and a "remote" link from the companion device 106 to a network 100 (e.g., using cellular or WLAN). As illustrated in FIG. 2 and described above, the remote link may be link 201. In this case the first transport link may include links 201 and 202. If the short range link is included, the accessory device 107 may be said to operate in "relay" mode. In other embodiments (e.g., or under other circumstances), the first transport link may not include the short range link, and the accessory device 106 may communicate with network 100 directly using a WLAN and/or cellular RAT. As illustrated in FIG. 2 and described above, such a direct link may be link 203.

The communication performed using the first transport link may include uplink and/or downlink transmissions of any type(s). For example, control and data transmissions may be included. Further, the communication may include transmissions for any application(s) executing on the accessory device 107. Among other possibilities, data for voice calls and/or visual display (e.g., social media, email, messaging, stocks, etc.) may be transmitted.

The first transport link may also change one or more times, and for any of various reasons. For example, if the short range link is used as an element of the first transport link, the short range link may change from a first short range link to a second short range link as described above in 602.

Similarly or additionally, the remote link of the companion device may change from a first remote link to a second remote link, e.g., between WLAN and cellular, between cellular RATs, or between cells of a cellular network, among other possibilities. Such a change in the remote link may be due to cell reselection, due to changes in network availability (or signal strength, etc.), or may be initiated by a user of companion device 106, among other possibilities. In the case that the short range link is not used as an element of the first transport link, the direct link (e.g., link 203) between the accessory device 107 and the network 100 may similarly change. For example, the direct link may change from a first direct link to a second direct link, e.g., between cellular and WLAN or may change between WLAN access points. Further, either or both of the direct link and the remote link may include multiple RATs, as desired. For example, one or more bearers of either link may operate on a first RAT and one or more other bearers of the same link may operate on (e.g., be offloaded to) a second RAT, and the allocation of bearers may change over time. Thus, one or more bearers of either link may be split over multiple RATs.

In 606, the companion device 106 may detect an event that may be relevant to selection of a transport link for the accessory device 107. Such an event may be any type of event that would impact the ability of the accessory device 107 to communicate via a relay connection including remote link 201. Broadly speaking, such an event may either reduce or increase the ability of the companion device 106 to provide relay communication services to the accessory device 107 via remote link 201. In other words, such events may be primarily based on the remote link 201 (and/or the ability of companion device 106) to communicate via the remote link, and may not be directly based on the short range link 202. Exemplary events are described below.

One exemplary event may be that companion device 106 may transition between a no service or limited service state and a full service state with regard to a cellular network (e.g., entering a no service state and exiting a full service state, or vice versa). In a no service (e.g., out-of-service or OOS) or limited service state, the companion device may not be able to communicate (e.g., efficiently or at all, respectively) and such a limitation may impact the usefulness of the cellular connection to the accessory device. For example, during a period in which the companion device 106 operates in a no service state, the accessory device 107 may not be able to use the cellular connection of companion device 106 as a component of a transport link. Thus, if the companion device 107 transitions from a no service state to a full service state (or vice versa), the companion device 107 may detect an event.

Another exemplary event may be that companion device 106 may transition between a link quality metric (LQM) Fair state to LQM Bad state (or vice versa). An LQM Bad state (e.g., or any LQM state worse than Bad) may allow little or no background traffic to be transmitted and received over a cellular connection, e.g., background traffic may be curtailed (or limited) partially or entirely. A LQM Fair state (e.g., or any LQM state better than Fair, e.g., an LQM Good state) may allow relatively more (e.g., or all) background traffic to be transferred over cellular. Companion device 106 may determine to enter or exit an LQM state based on one or more measurements (e.g., reference signal received power (RSRP), signal to interference and noise ratio (SINR), signal to noise ratio (SNR), energy to interference ratio (ECIO), etc.) and comparing such measurements to one or more thresholds. Additionally or alternatively, companion device 106 may determine to enter or exit an LQM state based on a frequency of communication failures, e.g., the number of random access or RACH failures in a period of time, e.g., a RACH failure rate. Companion device 106 may detect an event at any time that it transitions between LQM states, e.g., from an LQM Fair state to a LQM Bad state, or vice versa.

Another exemplary event may be a change in the quality of a cellular link, e.g., based on one or more measurements such as RSRP, RSRQ, SINR, SNR, transmission power, etc. Companion device 106 may detect an event based on the quality of a cellular link crossing a threshold, as measured by one or more such indicators. In response to such an event, the companion device 106 may change (e.g., increase, decrease, begin, end, pause, etc.) its use of the cellular link. For example, companion device 106 may offload one or more bearers to WLAN in response to a decrease in the quality of the cellular link.

Another exemplary event may be a change in the quality of a WLAN link, e.g., based on a radio quality indicator (e.g., reference signal strength indicator or RSSI) and/or a link quality indicator (e.g., a packet loss rate of uplink and/or downlink transmissions). Companion device 106 may detect an event based on the quality of a WLAN link crossing a threshold, as measured by one or more such indicators. In response to such an event, the companion device 106 may change (e.g., increase, decrease, begin, end, pause, etc.) its use of the WLAN link. For example, companion device 106 may transfer one or more bearers to cellular in response to a decrease in the quality of the WLAN link.

Another exemplary event may include an event initiated by a user of companion device 106. For example, the device may enter or exit airplane mode, or otherwise activate or deactivate a cellular or WLAN connection with a network. Additionally, the companion device 106 may be powered off. Companion device 106 may detect an event based on such an action by the user.

Another exemplary event may include a change in the amount or rate of data available to the accessory device 107 via a link of the companion device 106 (e.g., via remote link 201) based on activity of the companion device 106. For example, companion device 106 may begin or end a data transfer with a network, which may restrict or increase the data rate available to the accessory device on the remote link.

Based on detecting an event, companion device 106 may transmit assistance information to accessory device 107 (608). Such assistance information may be referred to as a "hint". The assistance information may inform the accessory device 107 of the detected event. For example, the assistance information may explicitly indicate the particular event (entering or exiting airplane mode, falling above or below a quality threshold, loss of service, gain of service, etc.) or may indicate the particular event more generically (e.g., indicating the link may be used or may no longer be used or indicating an increase or decrease in the quality or throughput of the link), according to various embodiments. The format of the assistance information may be configured as desired.

The assistance information may include additional information, as desired. For example, the assistance information may include the time of the event, e.g., when the event occurred or will occur. For example, in the case that the event is exiting airplane mode, the assistance information may include an estimate of when a cellular or WLAN connection with a network may be made. Similarly, in the case that the event is entering LQM mode, the assistance information may include when a cellular connection was (or will be) deactivated and may further include when such a connection may become available again (e.g., based on a minimum time between mode transitions, among other possibilities). Still further, the assistance information may include the cause of the event (e.g., a RACH failure rate, etc.). Still further, the assistance information may include details of any actions that the companion device 106 may take in relation to the event (e.g., initiating a cell selection scan, offloading a bearer, etc.). In other words, the assistance information may specify a response of companion device 106 to the detected event.

According to some embodiments, multiple events may be detected simultaneously (e.g., or within close time proximity). Assistance information may be transmitted for multiple events concurrently, or separate transmissions of assistance information may occur. For example, if one event causes a companion device 106 to disconnect a cellular connection and a second event causes the companion device 106 to connect a WLAN connection, both events may be reported simultaneously or separately.

According to some embodiments, assistance information may be transmitted anytime that an accessory device 107 is connected (e.g., via a short range link 202) to companion device 106. In other words, the assistance information may be transmitted regardless of what application(s) are executing on accessory device 107.

In some embodiments, the assistance information may vary based on the application(s) executing on accessory device 107. For example, different formats may be used and/or different levels of detail (e.g., additional information as described above) may be included depending on the application(s) that are executing.

According to some embodiments, assistance information may be transmitted related to events that impact any one (or more) of multiple possible or active remote links. For example, if companion device 106 is using a cellular remote link for all communication with network 100 and companion device 106 establishes a new WLAN connection with a network 100, companion device 106 may transmit assistance information to accessory device 107 describing the new WLAN connection. Similarly, if a WLAN remote link is active, and a cellular connection is lost, companion device 106 may transmit assistance information to accessory device 107 regarding the lost cellular connection, even if the WLAN link is being used for all payload data transfers with network 100. According to some embodiments, assistance information may only be transmitted related to an event that impacts a remote link that is (or may become) active for payload data transfers.

In some embodiments, the assistance information may indicate an amount or rate of data that may be used (e.g., over the remote link) by the accessory device after the event. For example, the companion device may have a low or non-existent allowed amount or rate of data available to the accessory device under poor link conditions, while the companion device is performing its own data transfers, etc.; however, the companion device could then change the amount or rate to a higher level and indicate that level to the accessory device upon detecting the event (e.g., when switching from cellular to WLAN, improving signal conditions, more availability based on the companion device's own data transfers, etc.). The assistance information may further indicate the amount of time that such a condition may be in effect, e.g., the duration of a data transfer of the companion device.

Based at least in part on receiving the assistance information, accessory device 107 may select a second transport link (610). The second transport link may be the same as the first transport link, or it may be different. Accessory device 107 may select the second transport link based at least in part on additional information, as desired. In other words, the assistance information may serve to alert the accessory device 107 to a change in the availability or quality of remote links (e.g., based on the detected event) which may be a component of the first and/or second transport links. Thus, the assistance information may be viewed as information about the transport link options available to the accessory device 107. The assistance information may enable the accessory device 107 to be aware of and respond to the detected event in a timely manner. For example, in response to assistance information indicating that a remote link will be (or is) no longer available (e.g., or available at a reduced quality), accessory device 107 may select a second transport link that does not rely on the remote link. In another example, in response to assistance information indicating that a remote link is (or will become) available (e.g., or available at an improved quality), accessory device 107 may select a second transport link that relies on the remote link.

In some embodiments, in addition to the assistance information, accessory device 107 may consider what, if any, applications are executing on the accessory device 107 in selecting the second transport link. In other words, the second transport link may be selected based at least in part on the communication requirements of the applications executing on the accessory device 107. For example, if an active application has stringent communication requirements, the accessory device 107 may be more likely to select a transport link that offers higher performance (e.g., higher throughput, lower delay, etc.), but requires more energy. In other words, based on assistance information indicating a decrease in quality of a remote link, if accessory device 107 has high communication requirements it may select a second transport link with a more energy intensive but higher throughput direct connection. Conversely, if most or possibly all active applications have relatively low communication requirements (e.g., are robust to delay, require relatively little throughput, etc.), the accessory device 107 may prioritize energy savings over link performance, and may select a second transport link accordingly. In other words, based on assistance information indicating a decrease in quality of a remote link, if accessory device 107 has low communication requirements it may not select a second transport link with a more energy intensive but higher throughput direct connection.

In some embodiments, in addition to the assistance information, accessory device 107 may consider the battery state (e.g., voltage, charge level, and/or charging status) of either or both of the accessory device 107 and the companion device 106. For example, if battery level of the accessory device 107 is below a threshold, accessory device 107 may select a second transport link that does not require an energy intensive direct link. Similarly, for example, if assistance information indicates a decrease in quality of a remote link and the battery level of accessory device 107 is below a battery level threshold, accessory device 107 may select a second transport link that relies on the remote link, e.g., in order to avoid the higher battery use of a direct link (thus the accessory device 107 may prioritize the battery level over the decrease in quality of the remote link). However, if the accessory device 107 has a high battery level (e.g., and/or is charging) and assistance information indicates a decrease in quality of the remote link, the accessory device 107 may select a transport link that includes an energy intensive direct link, such as cellular (e.g., if such a link offers better performance).

In some embodiments, in addition to the assistance information, accessory device 107 may consider the quality, performance, and/or existence (collectively, the availability) of one or more direct links (e.g., link 203 of FIG. 2) in selecting the second transport link. For example, accessory device 107 may take one or more measurements of one or more metrics (e.g., RSRP, RSRQ, SINR, SNR, reference signal strength indicator or RSSI, block error rate or BLER, bit error rate or BER, throughput, bandwidth, etc.) of any available direct links and may compare these measurements to one or more thresholds. For example, if RSRP of a direct link is low (e.g., below a threshold), accessory device 107 may select a second transport link that relies on a remote link, notwithstanding assistance information suggesting a decrease in quality of the remote link.

Similarly, in addition to the assistance information, accessory device 107 may consider the quality and/or performance of short range link 202 in selecting the second transport link. For example, accessory device 107 may take one or more measurements of one or more metrics (e.g., RSRP, RSRQ, SINR, SNR, RSSI, BLER, BER, throughput, bandwidth, etc.) of any available short range links and may compare these measurements to one or more thresholds. For example, if a short range link quality is low, accessory device 107 may select the direct link as the second transport link, notwithstanding assistance information indicating a newly available, high-quality remote link.

In some embodiments, in addition to the assistance information, accessory device 107 may consider the energy use of at least one of short range link 202 and direct link 203 in selecting a second transport link. For example, accessory device 107 may compare the energy use of the link options. Additionally or alternatively, the accessory device 107 may calculate one or more metrics that combine energy use with one or more quality/performance metrics. For example, the accessory device 107 may determine metrics such as energy use per throughput, and may use such determined metrics in selecting a transport link. In some embodiments, accessory device 107 may determine energy use per throughput of the first transport link, compare to energy use per throughput of a potential second transport link (e.g., in response to assistance information indicating availability of a new remote link) and select a second transport link based on the comparison.

In some embodiments, in addition to the assistance information, accessory device 107 may consider one or more user preferences or settings in selecting a second transport link. For example, based on a user preference for using a direct link (e.g., cellular), accessory device 107 may not select a second transport link relying on a newly available remote link, even if assistance information indicates that a high quality remote link becomes available.

Figure 7:
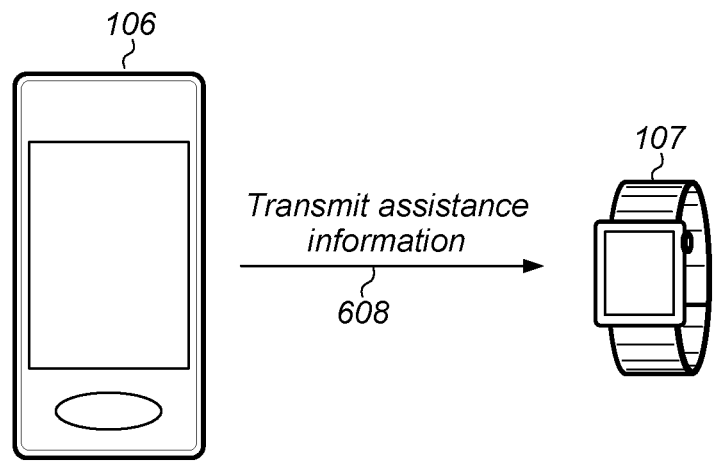
FIG. 7 is a diagram illustrating transmission of assistance information, according to some embodiments.

FIG. 7—Transmission of Assistance Information

FIG. 7 illustrates transmission of assistance information from companion device 106 to an exemplary accessory device 107 (608). The transmission may occur at any time that companion device 106 detects an event (e.g., relevant to a remote link). The transmission may be made on any available link between the two devices, e.g., a short range link. Additional information (e.g., including payload data) may be transmitted before, after, or concurrently with the assistance information. The accessory device 107 may or may not transmit information to the companion device 106. For example, the accessory device 106 may or may not respond to the assistance information. Further, the accessory device 107 may select a second transport link based at least in part on the assistance information.

Figure 8:
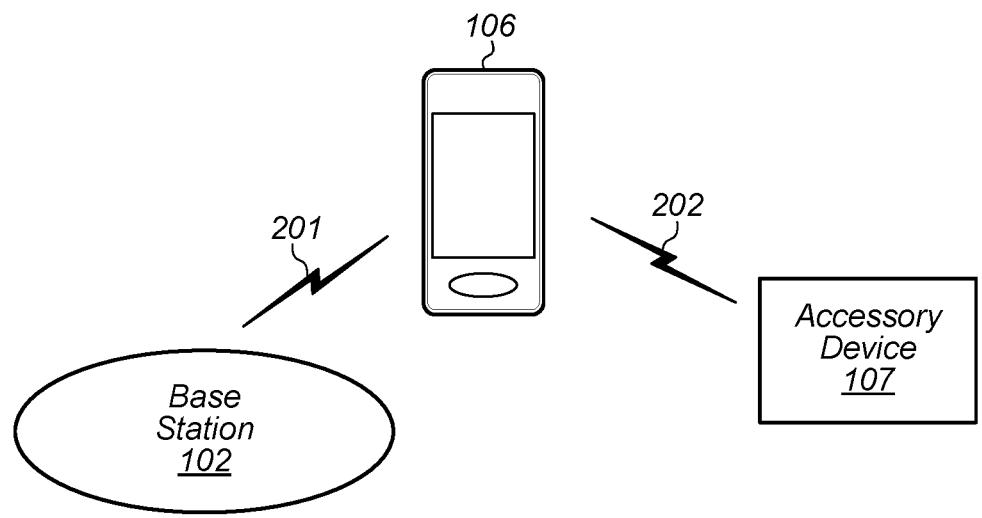
FIG. 8 illustrates an example system where an accessory device can selectively communicate with a cellular base station using a Bluetooth or WLAN link to a companion device, according to some embodiments.
Figure 9:
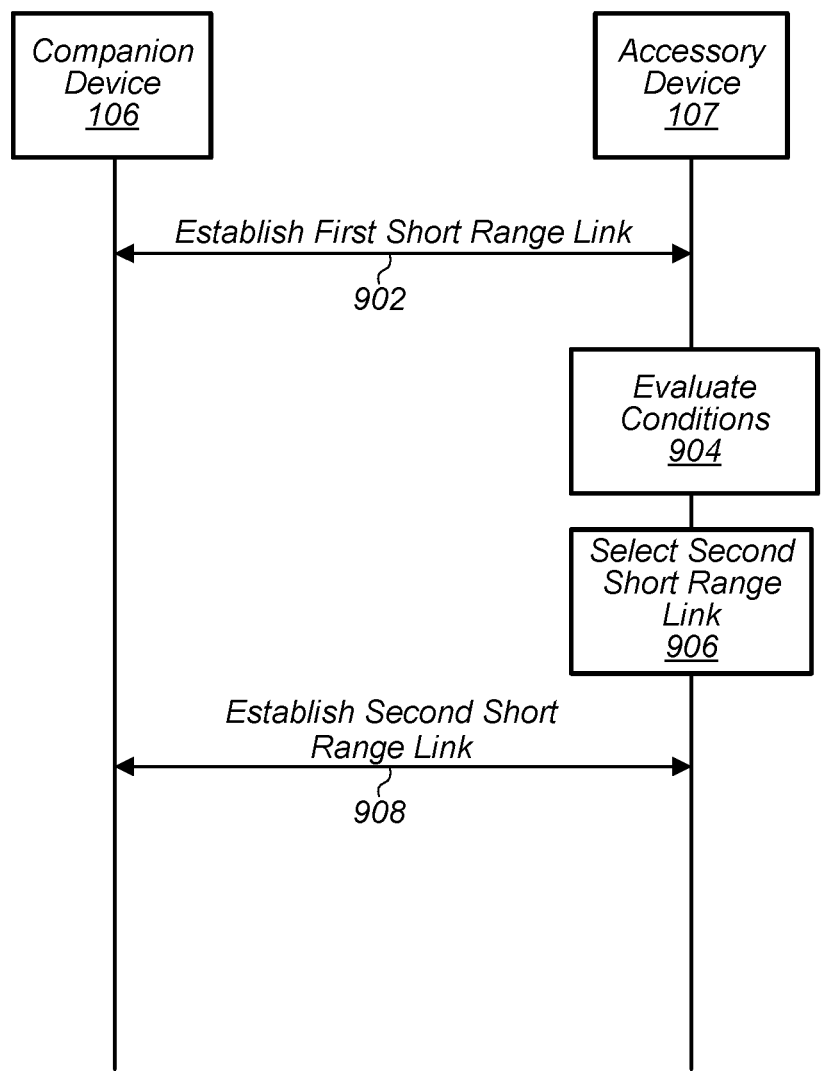
FIG. 9 is a communication flow diagram illustrating an exemplary method for an accessory wireless device to dynamically manage its short range link operations, according to some embodiments.

FIGS. 8 and 9—Short Range Link Selection

FIG. 8 illustrates an accessory device 107 in communication with a companion device 106, which in turn is in communication with BS 102. Remote link 201 between the BS 102 and companion device 106 may be a cellular link and/or WLAN link. Short range link 202 between accessory device 107 and companion device 106 may be a Bluetooth or WLAN link. FIG. 8 is similar to FIG. 2, although link 203 (e.g., a direct link between accessory device 107 and BS 102) is omitted from FIG. 8 for illustrative purposes. However, it should be noted that this omission of link 203 is illustrative only, and that the embodiments described herein may apply whether or not a direct link (e.g., link 203) is present.

WLAN (e.g., 802.11/Wi-Fi) may share channels (e.g., 2.4 GHz) with Bluetooth, so traffic on a WLAN link may adversely impact performance of a Bluetooth link and vice versa. Because Bluetooth may be a relatively low power technology (in comparison to WLAN), radio link conditions of a Bluetooth link may fluctuate significantly due to small changes (e.g., a small change in the distance between accessory device 107 and companion device 106 may significantly impact a Bluetooth link). In response to such fluctuations, an accessory device 107 may transition from Bluetooth to WLAN, according to some embodiments. Such a switch from Bluetooth to WLAN may adversely impact performance of other Bluetooth connections (e.g., including any other devices that may be connected by Bluetooth to the companion device 106). For example, if accessory device 107 (e.g., a smart watch) transitions to WLAN, the performance of devices such as headphones or other accessories that may be connected (via Bluetooth) to companion device 106 may be harmed. Moreover, as noted above, a transition to WLAN may increase the energy use of the accessory device 107. In order to avoid or reduce such impacts, the accessory device 107 may be configured to select (e.g., or maintain/continue) a Bluetooth link for short range link 202, as opposed to a WLAN link, subject to certain criteria. According to some embodiments, the accessory device 107 may dynamically decide when to use a Bluetooth short range link 202 and when to use a WLAN link 202. For example, the accessory device 107 may select a WLAN link under conditions in which the performance benefits of WLAN may improve the user experience and may select a WLAN link under other conditions (e.g., in which the lower power use of the Bluetooth link may be more advantageous).

FIG. 9 is a communication flow diagram illustrating one such method for an accessory device in communication with a companion device, according to some embodiments. Aspects of the method of FIG. 9 may be implemented by devices, such as a UE 106 and accessory device 107 illustrated in and described with respect to FIGS. 1-3, or more generally in conjunction with any of the computer systems or devices shown in the Figures herein, among other devices, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 902, companion device 106 and accessory device 107 may establish a short range link, e.g., a first short range link. The short range link may use a short range communication protocol, such as Bluetooth or WLAN (e.g., 802.11/Wi-Fi)

to connect the two devices (e.g., companion device 106 and accessory device 107). Thus the first short range link may be established using a first RAT. As illustrated in FIGS. 2 and 8 and described above, the short range link may be link 202. Accessory device 107 may exchange data (e.g., payload data and/or control data) with companion device 106 at any time after the short range link is established.

Accessory device 107 may evaluate conditions (904) in order to determine whether or not to change the RAT of the short range link (e.g., whether to switch from Bluetooth to WLAN or vice versa). Accessory device 107 may evaluate any of numerous types of conditions. In some embodiments, accessory device 107 may evaluate conditions related to the first short range link and/or may evaluate conditions related to one or more alternative short range links (e.g., using a different RAT), among various possibilities.

One type of condition that accessory device 107 may evaluate is the position or proximity of the accessory device 107 relative to the user. For example, accessory device 107 may consider whether or not the user is wearing the accessory device 107 (e.g., whether a smart watch is worn on the wrist, among other possibilities). Proximity to the user may correspond to circumstances in which the user experience may depend on the performance of short range link 202. Conversely, if the accessory device 107 is not in close proximity to the user, performance of short range link 202 may not materially impact the user experience.

Another type of condition that accessory device 107 may evaluate is the applications, if any, that are executing on accessory device 107 and/or if the user is actively using or interacting with the accessory device. For example, the accessory device 107 may evaluate whether or not a foreground application (e.g., voice assistants such as SIRI) is executing. A foreground application may indicate that a higher performance link is preferred (e.g., to improve user experience). Similarly, a software update may indicate WLAN (e.g., in order to achieve higher data rates) while lower data rate applications (e.g., notifications) may indicate Bluetooth.

Another type of condition that accessory device 107 may evaluate is radio link conditions, e.g., of the Bluetooth link, the WLAN link, or both. The accessory device 107 may evaluate metrics of one or more layers and/or cross layer metrics and may calculate quality indicators based on such metrics. Further, the accessory device 107 may evaluate radio link conditions over time. For example, if a Bluetooth link has consistently shown poor conditions for a significant length of time (e.g., 30-60 seconds, although any time period may be used), a WLAN link may be preferred. Such a time threshold may allow the accessory device 107 to avoid switching to WLAN due to temporary/intermittent interruptions in Bluetooth (e.g., a user covering a smart watch with a hand), but switch to WLAN in response to longer duration Bluetooth limitations (e.g., an accessory device 107 moving to a different floor, away from the companion device 106).

For example, accessory device 107 may determine metrics related to the Bluetooth link. Such metrics may relate to any type of Bluetooth link, e.g., low energy (LE) and/or Classic. Such metrics may include RSSI, packet error rate (PER) in either or both transmit and receive directions, and/or PHY throughput (e.g., PHY bit rate, which may depend on whether an LE or Classic link is active) in either or both transmit and receive directions, among other possibilities. Such metrics may be reported by the Bluetooth circuitry periodically (e.g., every second, among other possibilities) and/or may be measured as (e.g., when) needed.

Accessory device 107 may further estimate or calculate quality indicators for the Bluetooth link based on such metrics. For example, accessory device 107 may determine PHY quality indicators based on whether an LE or Classic link is active. Accessory device 107 may determine link quality indicators (e.g., Rx/Tx packet error rate (PER)). A moving average of any such metrics may be tracked over time. Such link quality indicators may evaluate link layer quality using MAC metrics and/or may utilize a moving average of PER. Such link quality indicators may depend on the level of interference. Accessory device 107 may determine data rate quality indicators. Such data rate quality indicators may estimate bandwidth or throughput (e.g., based on an active modulation and coding scheme, which may depend on the distance between accessory device 107 and companion device 106). For example, such data rate quality indicators may be based on a combination of Rx/Tx PHY rates and PER.

Accessory device 107 may determine metrics related to the WLAN link. For example, accessory device 107 may determine RSRP, RSRQ, SINR, SNR, RSSI, BLER, BER, PER, throughput, bandwidth, etc. A moving average of any such metrics may be tracked over time. Such metrics may be reported periodically and/or may be measured as (e.g., when) needed. For example, if accessory device is using a Bluetooth link and operating in a low power WLAN mode (e.g., a Wi-Fi low power associated (LPAS) mode, e.g., to maintain a WLAN connection while using the Bluetooth link) such metrics may be reported every 20 seconds (among other possibilities) or may be determined on request. In an LPAS mode, a WLAN radio may be associated with an access point (e.g., a Wi-Fi access point), and may have a valid IP address. However, no data traffic (e.g., except for signaling traffic, e.g., periodic beacon traffic) may be exchanged over WLAN while operating in the LPAS mode, according to some embodiments. In order to avoid any delay associated with querying WLAN metrics, the accessory device 107 may query the WLAN metrics as soon as any (e.g., relevant) input from the user (e.g., a button push or digital crown press) is detected. In other words, accessory device 107 may proactively fetch the WLAN metrics.

Accessory device 107 may determine higher layer metrics (e.g., identity services metrics). Such metrics may indicate the end-to-end quality of the WLAN link or Bluetooth link with companion device 106. For example, such metrics may include round trip time (RTT), packet size (e.g., Tx and/or RX), number of sent messages, number of delivered messages, number of transmission failures, and/or number of received messages. Such metrics may be summarized (e.g., statistically) or combined over time (e.g., averages, variances, rates of change, etc.) For example, accessory device 107 may evaluate average RTT and or a packet loss rate (e.g., messages delivered as a fraction of messages sent over time). Such metrics may be calculated for a connected link and may be considered transport quality indicators. Such metrics may be based at least in part on information received from companion device 106 (e.g., acknowledgements and/or metrics observed by the companion device 106).

Other types of conditions that accessory device 107 may evaluate include the result(s) of previous link recommendations. For example, accessory device 107 may consider that a previous link recommendation (e.g., WLAN) was unsuccessful (e.g., not reachable because the WLAN network may be a captive network, such as a hotel Wi-Fi network that does not allow access to the internet prior to the user accepting terms and conditions, etc.).

Accessory device 107 may evaluate conditions for any period of time. For example, accessory device 107 may continue to monitor conditions until a change in conditions (e.g., a change of at least a minimum magnitude and/or persisting for at least a minimum amount of time) is detected. Accessory device 107 may use one or more timers to evaluate conditions over time. For example, accessory device 107 may initiate a timer when a change in conditions is initially detected. Further, accessory device 107 may determine whether or not a WLAN network has changed (e.g., a user has accepted terms and conditions to access the internet so that a Wi-Fi network is no longer a captive network).

Accessory device 107 may evaluate conditions using one or more entry and/or exit criteria for WLAN/Bluetooth links, according to some embodiments. Entry criteria may represent one or more conditions that indicate that using a link may be preferred; conversely exit criteria may include conditions that indicate that a link may not be preferred. Entry and exit criteria may use hysteresis. For example, entry criteria for Bluetooth may be a moving average RSSI greater than −70 dBM and a moving average PER less than 20%. Exit criteria for Bluetooth may be or include a moving average RSSI less than −80 dbM, a moving average PER greater than 50%, a close proximity to the user (e.g., worn on the wrist), and/or a determination that the user is actively using the accessory device 107 (e.g., whether foreground applications are executing). Entry criteria for WLAN may be moving average RSSI greater than −75 dBM and moving average SNR greater than 10. Exit criteria for WLAN may be moving average RSSI less than −85 dBM and moving average SNR less than 5. It will be appreciated that the criteria and thresholds listed are exemplary only and that other metrics and/or numerical values may be used, according to some embodiments.

Based at least in part on a determination of the applications executing on the accessory device and/or the nature of the first short range link, the accessory device 107 may apply and evaluate entry and exit criteria in any of various manners (e.g., in different orders and/or to the different links). For example, based on a determination that only "default" applications are executing, an accessory device 107 may evaluate conditions in a manner that prioritizes Bluetooth (e.g., to achieve lower energy use). Alternatively, in response to a determination that one or more "priority" (e.g., foreground) applications are executing, the accessory device 107 may evaluate conditions in a manner that prioritizes WLAN (e.g., to achieve higher performance). FIGS. 14-17, discussed below, provide examples of various manners in which such entry and exit criteria may be applied.

Based at least in part on the evaluated conditions, accessory device 107 may select a second short range link (906). The second short range link may be the same as the first short range link, or it may be different, e.g., it may or may not use the same RAT. The short range link may change from WLAN to Bluetooth, from Bluetooth to WLAN, may remain Bluetooth, or may remain WLAN, according to some embodiments.

In some embodiments, if the first short range link is a Bluetooth link the second short range link may be a WLAN link. For example, the WLAN link may be selected in response to poor conditions on the Bluetooth link for at least a minimum amount of time, e.g., a moving average of one or more metrics of the Bluetooth link may fail to pass one or more corresponding thresholds for at least 30 seconds (e.g., or any other desired amount of time) among other possibilities.

In some embodiments, if the accessory device 107 is in close proximity to the user (e.g., worn on the wrist) and/or a foreground application is executing, the accessory device may select a second transport link using a higher performance RAT (e.g., WLAN) more quickly. For example, in contrast to the previous example, if the accessory device 107 is worn, a foreground application is executing, and a Bluetooth metric falls below a threshold, the accessory device 107 may not wait for a timer to expire prior to selecting a WLAN link for the second short range link.

In some embodiments, the accessory device 107 may select a second short range link using one or more entry and/or exit criteria. For example, if the first short range link is a WLAN link and the WLAN link meets WLAN exit criteria and a Bluetooth link meets Bluetooth entry criteria, the second short range link may be Bluetooth, according to some embodiments. Similarly, if the first short range link is Bluetooth, and Bluetooth exit criteria and WLAN entry criteria are met, the second short range link may be WLAN, according to some embodiments.

According to some embodiments, the accessory device may use one or more timers to prevent rapid (e.g., ping pong) changes in the short range link. For example, accessory device 107 may initiate a timer (e.g., for 30 seconds) following a change in short range link and may not change the short range link again until after expiration of the timer. For example, such a timer may add hysteresis to prevent (e.g., unnecessary) rapid switching, according to some embodiments. Such a timer may be referred to as a debounce timer.

If the selected second short range link is different than the first short range link, the accessory device 107 may establish the second short range link with companion device 106 (908). The first short range link may be de-established, ended, or deferred. In some embodiments, information related to the first short range link may be stored or maintained in order to allow for quick reestablishment of the first short range link at a later time. Accessory device 107 and companion device 106 may exchange data using the second short range link, according to some embodiments. If the selected second short range link is the same as the first short range link, the first short range link may be maintained.

FIGS. 10-13—Data Flow Illustrations

Figure 10:
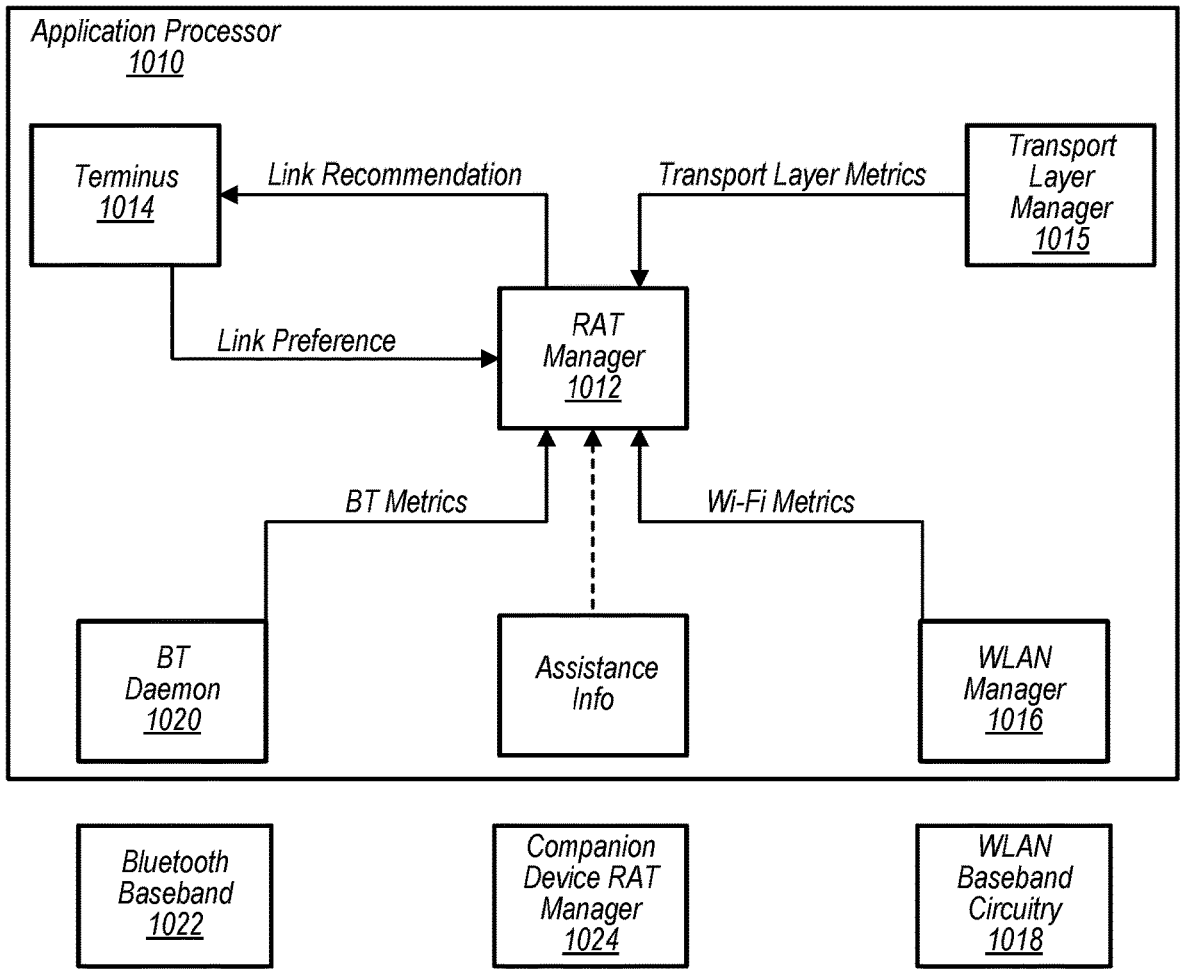
FIG. 10 is a block diagram illustrating RAT management by an accessory device, according to some embodiments.

FIG. 10 illustrates an application processor 1010 of accessory device 107, according to some embodiments. RAT manager 1012 may be a software application executing on the application processor 1010 or may be a separate processor, among various possibilities. RAT manager 1012 may provide link recommendations to a terminus 1014 based at least in part on information (e.g., companion assistance information and/or metrics) received from other components, e.g., according to some embodiments. Terminus 1014 may also provide link preference information to the RAT manager 1012. Such link preference information may be based on the activity of one or more applications executing on the accessory device 107, for example a voice assistant. A transport layer manager 1015 may provide transport layer metrics. A WLAN manager 1016 may provide WLAN metrics, in connection with WLAN baseband circuitry 1018. In order to avoid any delay associated with querying WLAN metrics (e.g., due to the time required for communication between application processor 1010 and WLAN baseband circuitry 1018) while the accessory device 107 is operating in a low power mode, the RAT manager 1012 may query the WLAN metrics as soon as any (e.g., relevant) input from the user (e.g., a button push) is detected. Bluetooth (BT) Daemon 1020, in connection with Bluetooth baseband 1022, may provide Bluetooth metrics. Bluetooth baseband 1022 may be a Bluetooth chip or may be on a common chip with other communication circuitry, among various possibilities. A RAT manager 1024 of companion device 106 may provide assistance information.

Figure 11:
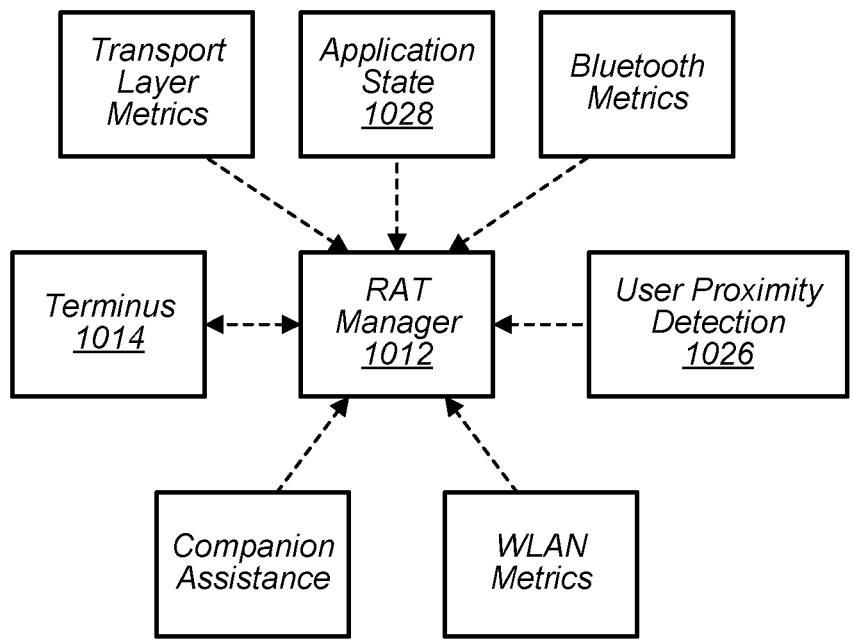
FIGS. 11-13 are block diagrams illustrating information flow to and from a RAT manager, according to some embodiments.

FIG. 11 illustrates RAT manager 1012 receiving data from various sources and informing terminus 1014 of a selected RAT, according to some embodiments. FIG. 11 includes some additional detail relative to FIG. 10. A user proximity detection module 1026 may inform the RAT manager 1012 of the proximity of the user relative to accessory device 107, e.g., whether or not the accessory device is being worn, e.g., whether a wrist band of is clasped. An application state module 1028 may inform the RAT manager 1012 of the state of any (e.g., or all) applications executing on accessory device 107, e.g., whether any foreground applications are active and/or the communication requirements of any active applications.

Figures 12, 13:
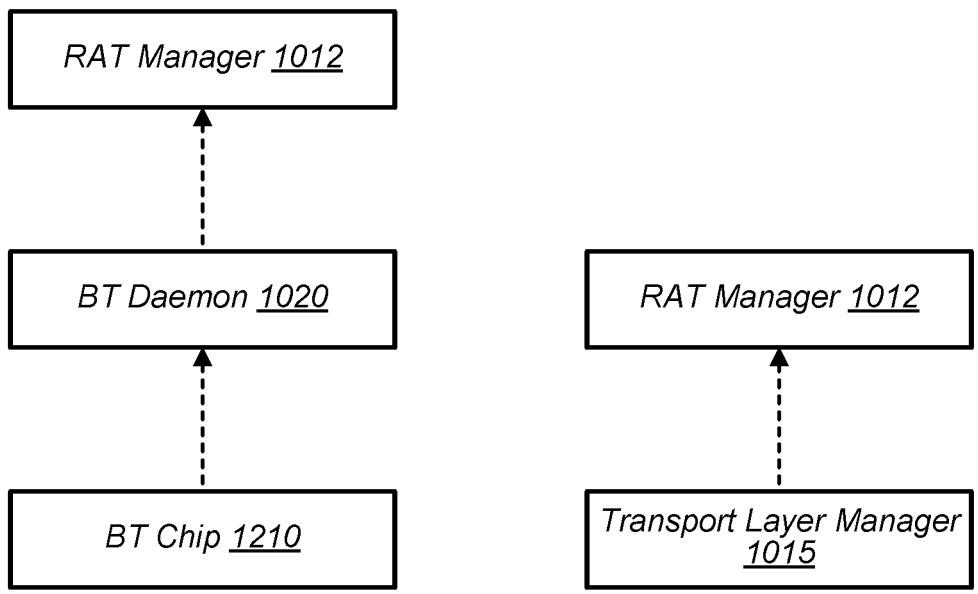

FIG. 12 illustrates a BT chip 1210 (e.g., BT baseband 1022) providing information to BT daemon 1020, which in turn provides BT metrics to RAT Manager 1012, according to some embodiments. Such BT metrics may be or include any or all of the metrics discussed herein, among other possibilities.

FIG. 13 illustrates transport layer manager 1015 providing higher layer metrics (e.g., transport layer metrics) to RAT manager 1012, according to some embodiments. Such transport layer metrics may be or include any or all of the metrics discussed herein, among other possibilities.

FIGS. 14-17—Short Range Link Selection Flow Charts

FIGS. 14-17 illustrate exemplary short range link selection processes for an accessory device 107 according to embodiments of the methods disclosed herein. It will be appreciated that the illustrated processes are exemplary only and that the exemplary illustrations are not limiting to the disclosure as a whole.

Figure 14:
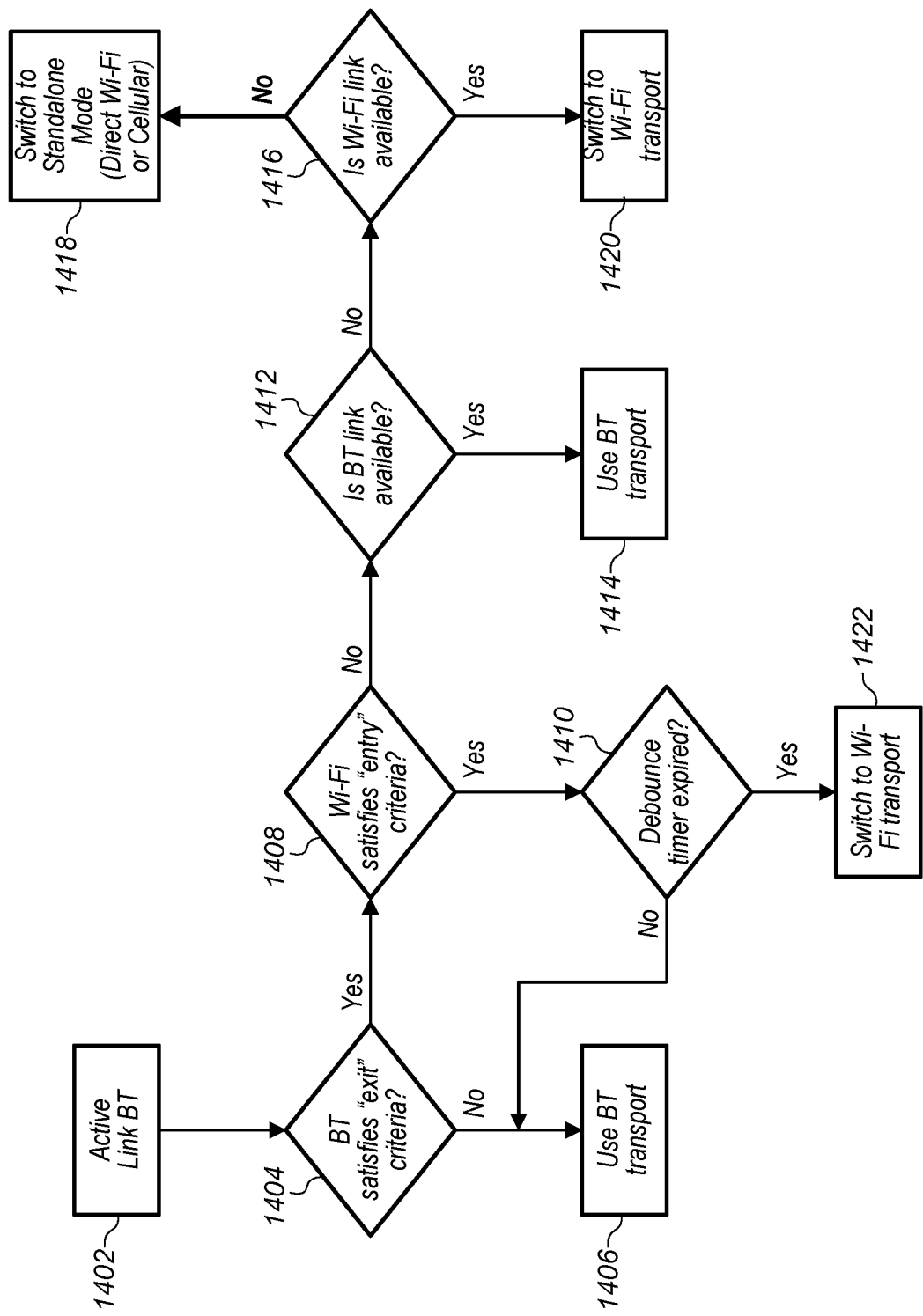
FIGS. 14-17 are flow chart diagrams illustrating exemplary operations for dynamic short range link management, according to some embodiments.

FIG. 14 illustrates a method for selecting a second short range link, according to some embodiments. In the illustrated example, the application traffic of the accessory device 107 may be associated with default applications (e.g., including weather, stocks, etc.). The first short range link may be Bluetooth (1402). The accessory device 107 may determine whether the Bluetooth link satisfies Bluetooth exit criteria (1404). If the Bluetooth exit criteria are not satisfied (1406), the accessory device 107 may continue to use Bluetooth (e.g., the second short range link may be Bluetooth, e.g., the second short range link may be the same as the first short range link). Continuing to use Bluetooth may allow the accessory device 107 to save power without harming the user experience, e.g., in the case that Bluetooth radio link conditions are poor, but other Bluetooth exit conditions are not satisfied (for example, the accessory device 107 may not be in close proximity to the user and/or no foreground applications may be executing and/or the user may not be actively using accessory device 107), a switch to WLAN may not improve the user experience. If the BT exit criteria are satisfied (1408), the accessory device 107 may determine whether a WLAN (e.g., Wi-Fi) link with companion device 106 satisfies entry criteria. If the WLAN entry criteria are satisfied (1410), the accessory device 107 may determine whether a debounce timer has expired. If the debounce timer has not expired (1406), the accessory device 107 may continue to use Bluetooth transport, e.g., in order to avoid transitioning between short range links too rapidly. If the debounce timer has expired (1422), the accessory device 107 may switch to WLAN (e.g., the second short range link may be WLAN). If the BT exit criteria are not satisfied (1412), the accessory device 107 may determine whether a Bluetooth link is available. Availability of a link may be a different criteria/standard than whether the link meets entry or exit criteria. For example, a link with a low RSSI may be available, even though it may not meet entry criteria and/or may meet exit criteria. A link may be considered not to be available if the link is lost/unusable, for example if RSSI is very low. For example, a Bluetooth or WLAN link may be considered available when the accessory device 107 is associated with an access point or companion device 106 and has a valid routable IP address. Such a link may not be considered available if the accessory device 107 has lost association with the companion device 106 or access point. If a BT link is available (1414), the accessory device 107 may continue to use Bluetooth (e.g., the second short range link may be Bluetooth). If a BT link is not available (1416), the accessory device may determine whether a WLAN link is available with the companion device 106. If no WLAN link is available (1418), the accessory device 107 may enter a standalone mode and use either a direct WLAN link (e.g., to an access point) or a direct cellular link (e.g., to BS 102). In other words, referring back to FIG. 2, accessory device 107 may use link 203, and may not use short range link 202, e.g., at least for a period of time. If a WLAN link is available with companion device 106 (1420), the accessory device 107 may remain in a relay mode and may switch to WLAN.

Figure 15:
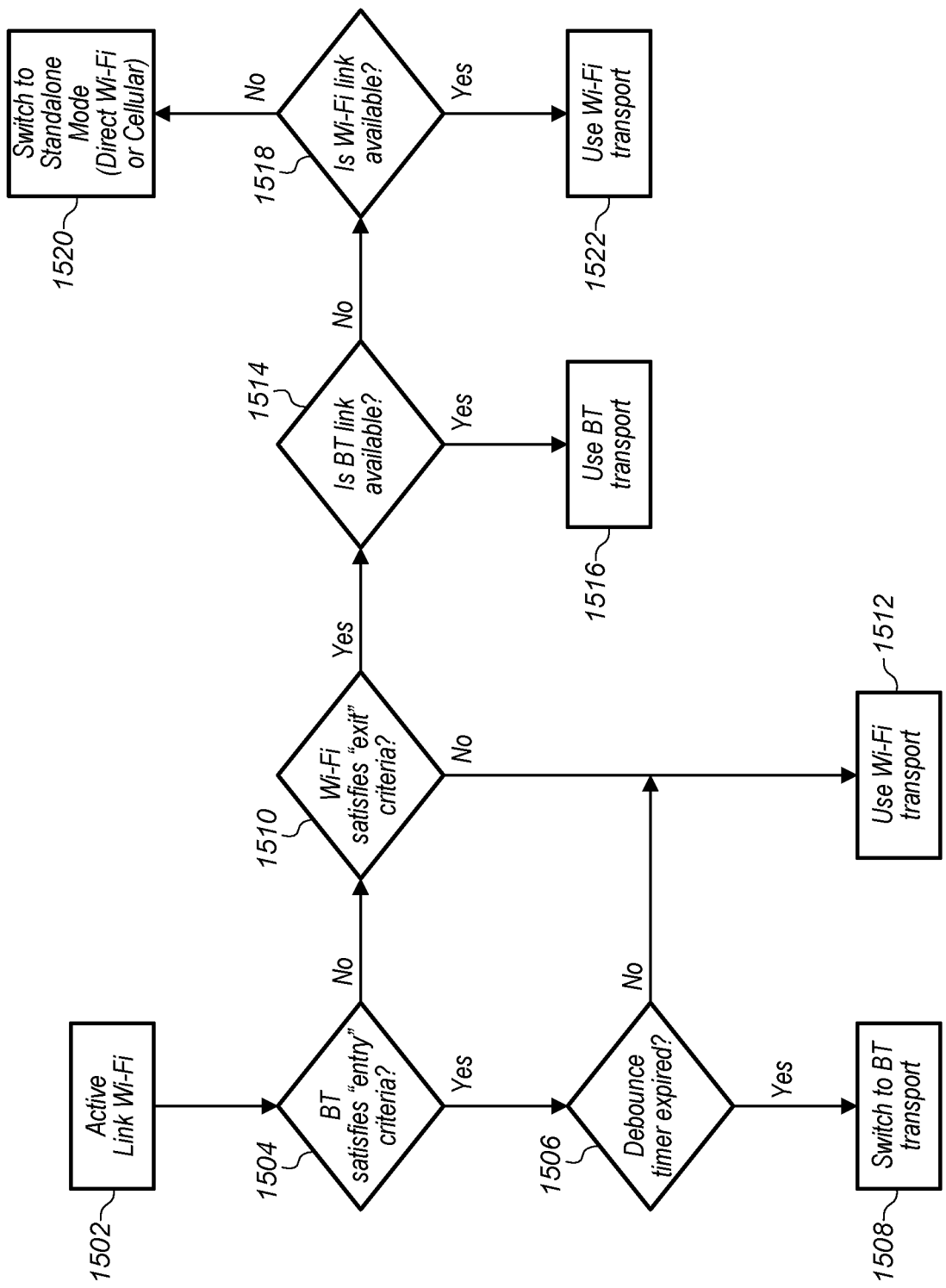

FIG. 15 illustrates a method for selecting a second short range link, according to some embodiments. In the illustrated example, the application traffic of the accessory device 107 may be associated with default applications (e.g., including weather, stocks, etc.). The first short range link may be WLAN (1502). The accessory device 107 may determine whether a Bluetooth link satisfies Bluetooth entry criteria (1504). If the Bluetooth entry criteria are satisfied (1506), the accessory device 107 may determine whether a debounce timer has expired. If the debounce timer has expired (1508), the accessory device 107 may switch to BT. If the debounce timer has not expired (1512), the accessory device 107 may continue to use WLAN. If the Bluetooth entry criteria are not satisfied (1510), the accessory device 107 may determine whether the WLAN link with companion device 106 satisfies exit criteria. If the WLAN exit criteria are not satisfied (1512), the accessory device 107 may continue to use WLAN. If the WLAN exit criteria are satisfied (1514), the accessory device 107 may determine whether a Bluetooth link is available. If a BT link is available (1516), the accessory device 107 may switch to BT. If no BT link is available (1518), the accessory device 107 may determine whether a WLAN link with companion device 106 is available. If no WLAN link with the companion device 106 is available (1520), accessory device 106 may enter a standalone mode and use either a direct WLAN link (e.g., to an access point) or a direct cellular link (e.g., to BS 102). If a WLAN link is available (1522), the accessory device 107 may continue to use WLAN.

Figure 16:
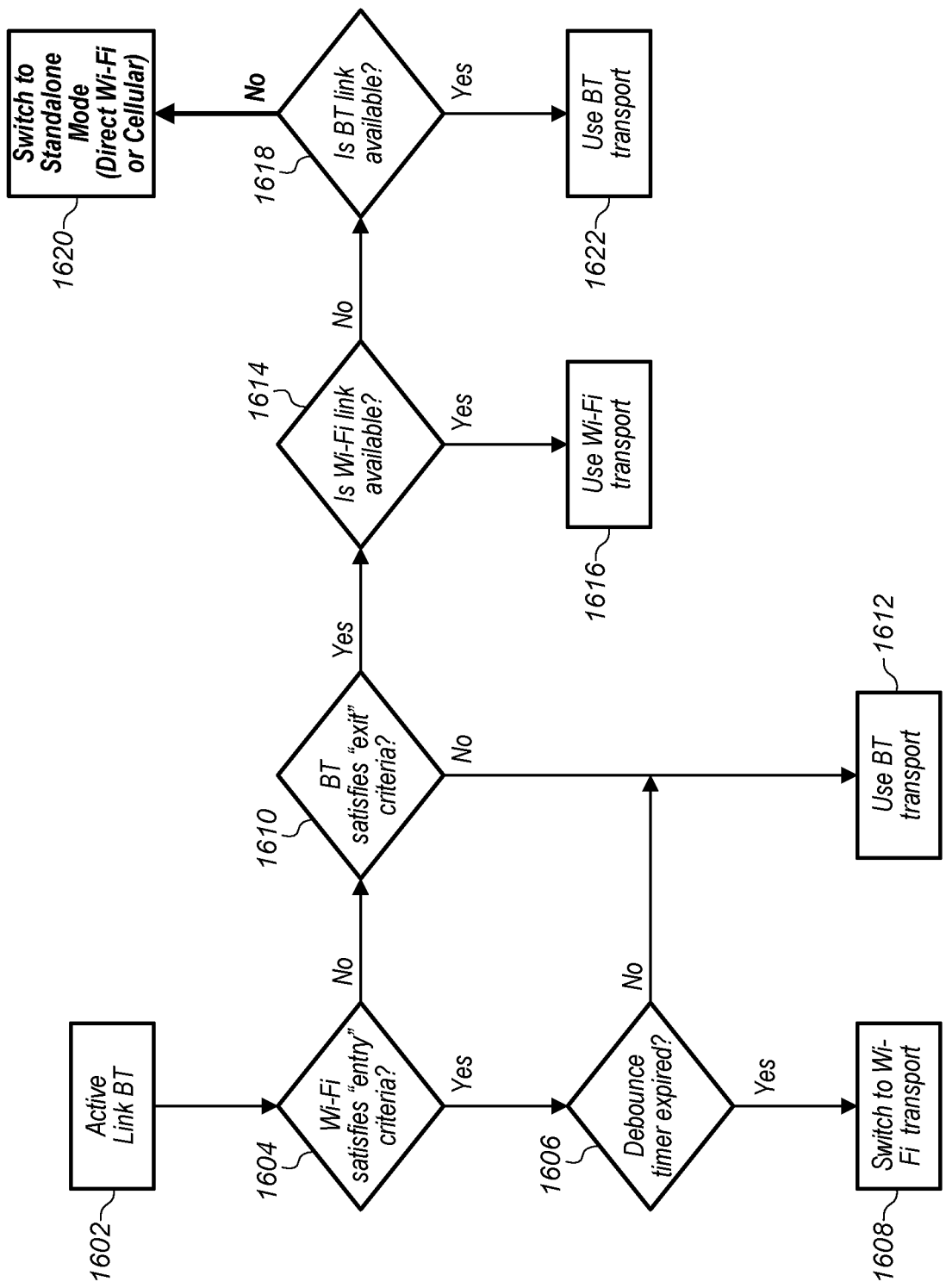

FIG. 16 illustrates a method for selecting a second short range link, according to some embodiments. In the illustrated example, the application traffic of the accessory device 107 may include a priority application (e.g., software update, etc.). The first short range link may be Bluetooth (1602). The accessory device 107 may determine whether a WLAN link satisfies entry criteria (1604). If the WLAN link satisfies the entry criteria (1606), the accessory device 107 may determine whether a debounce timer has expired. If the debounce timer has expired (1608), the accessory device 107 may switch to WLAN. If the debounce timer has not expired (1612), the accessory device 107 may continue to use Bluetooth. If the WLAN ink does not satisfy the entry criteria (1610), the accessory device 107 may determine whether the Bluetooth link satisfies exit criteria. If the Bluetooth link does not satisfy exit criteria (1612), the accessory device 107 may continue to use Bluetooth. If the Bluetooth link does satisfy exit criteria (1614), the accessory device 107 may determine whether a WLAN link is available. If a WLAN link is available (1616), the accessory device 107 may use the WLAN link. If no WLAN link is available (1618), the accessory device 107 may determine whether a Bluetooth link is available. If no Bluetooth link is available (1620), the accessory device 107 may enter a standalone mode and may use either a direct WLAN link (e.g., to an access point) or a direct cellular link (e.g., to BS 102). If a Bluetooth link is available (1622), the accessory device 107 may continue to use Bluetooth.

Figure 17:
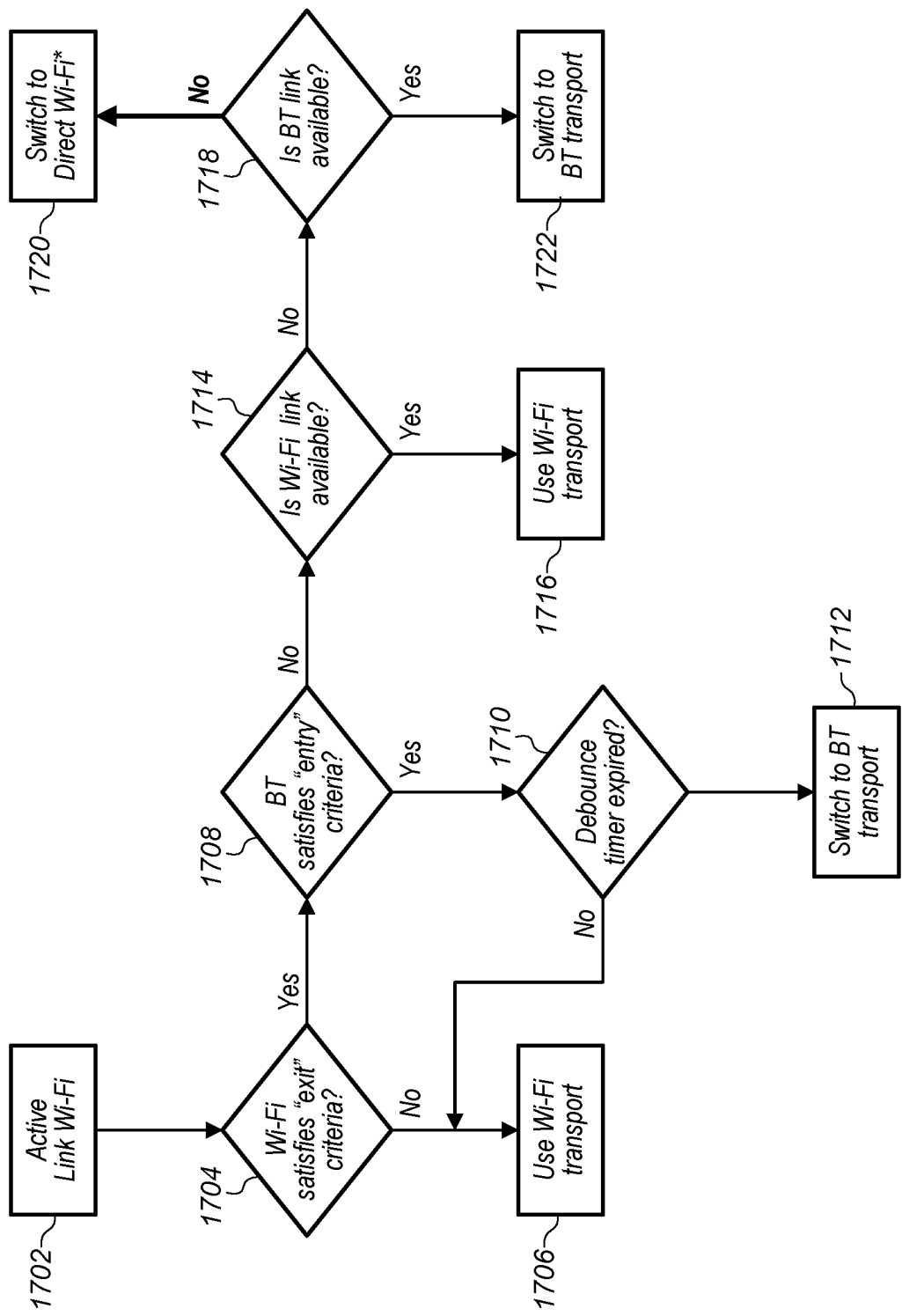

FIG. 17 illustrates a method for selecting a second short range link, according to some embodiments. In the illustrated example, the application traffic of the accessory device 107 may include a priority application (e.g., software update, etc.). The first short range link may be WLAN (1702). The accessory device 107 may determine whether the WLAN link satisfies exit criteria (1704). If the WLAN link does not satisfy the exit criteria (1706), the accessory device 107 may continue to use WLAN. If the WLAN link does satisfy the exit criteria (1708), the accessory device 107 may determine whether a Bluetooth link satisfies entry criteria. If the Bluetooth link satisfies entry criteria (1710), the accessory device 107 may determine whether a debounce timer has expired. If the debounce timer has not expired (1706), the accessory device 107 may continue to use WLAN. If the debounce timer has expired (1712), the accessory device 107 may switch to Bluetooth transport. If the Bluetooth link does not meet entry criteria (1714), the accessory device 107 may determine whether a WLAN link is available. If a WLAN link is available (1716), the accessory device may continue to use WLAN. If no WLAN link is available with companion device 106 (1718), accessory device 107 may determine whether a Bluetooth link is available. If no Bluetooth link is available (1720), the accessory device 107 may enter a standalone mode and may use a direct WLAN link (e.g., to an access point, e.g., if such a direct link is available) or may use a direct cellular link. If a Bluetooth link is available (1722), the accessory device 107 may switch to BT transport.

Exemplary Embodiments

In the following, further exemplary embodiments are disclosed.

One set of embodiments includes an apparatus, comprising: one or more processing elements, wherein the one or more processing elements which may be configured to cause an accessory wireless device to: establish a short range link with a companion wireless device; receive assistance information from the companion device, wherein the assistance information concerns a communication link between the companion device and a network; and select a transport link, wherein the transport link is selected based at least in part on the assistance information.

In some embodiments, the transport link may be selected based at least in part on at least one application executing on the accessory wireless device.

In some embodiments, the transport link may be selected based at least in part on battery state of at least one of: the accessory wireless device; and the companion wireless device.

In some embodiments, the transport link may be selected based at least in part on the availability of one or more direct links between the accessory wireless device and a network.

In some embodiments, the one or more processing elements may be further configured to cause the accessory wireless device to: measure a quality of the short range link with the companion device, wherein the transport link is selected based at least in part on the quality of the short range link.

In some embodiments, the transport link may be selected based at least in part on energy use of at least one link.

In some embodiments, the transport link may be selected based at least in part on a comparison of energy use per throughput ratio of at least two potential transport link.

In some embodiments, the transport link may be selected based at least in part on at least one user setting.

In some embodiments, a method for operating a companion wireless device, may comprise: communicating with a network using a first radio access technology (RAT); communicating with an accessory device using a second RAT; detecting a first event, wherein the first event concerns the communication of the companion wireless device and the network; and transmitting assistance information to the accessory device, wherein the assistance information is based at least in part on the first event.

In some embodiments, the first RAT may be a cellular RAT, and the first event may comprise the companion device entering or exiting a full service state with regard to the network.

In some embodiments, the first RAT may be a cellular RAT, and the first event may comprise the companion device entering or exiting a state that curtails background traffic over the network.

In some embodiments, the first event may comprise detecting a change in the quality of a link with the network using the first RAT.

In some embodiments, the first RAT may be a wireless local area network (WLAN) RAT, and said detecting the change in the quality of the link with the network using the first RAT may be based on at least one of: a radio quality indicator; and a link quality indicator.

In some embodiments, the first event may comprise an event initiated by the user of the companion wireless device.

In some embodiments, an apparatus may comprise one or more processing elements, wherein the one or more processing elements may be configured to cause a companion wireless device to: establish a short range link with an accessory wireless device; detect a first event related to a remote link with a network; and transmit assistance information to the accessory wireless device, wherein the assistance information is based at least in part on the event.

In some embodiments, the one or more processing elements may be further configured to cause the companion wireless device to: exchange data with the accessory device via the short range link, wherein at least some data is exchanged prior to the detection of the first event.

In some embodiments, the assistance information may include a data rate available to the accessory device via a connection of the companion wireless device.

In some embodiments, the assistance information may include the time of the first event.

In some embodiments, the assistance information may specifies a response of the companion device to the first event.

In some embodiments, the one or more processing elements may be further configured to cause the companion wireless device to: detect a second event, wherein the assistance information may be further based on the second event.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
one or more processors, wherein the one or more processors are configured to cause an accessory wireless device to:
establish a short range link with a companion wireless device;
receive assistance information from the companion wireless device, wherein the assistance information is based on an upcoming change in connectivity of a communication link between the companion wireless device and a network, wherein the upcoming change in connectivity includes an upcoming change in radio access technology (RAT) of the communication link;
determine a communication requirement of an application executing on the accessory wireless device;
select a transport link from at least two potential transport links for communication between the accessory wireless device and the network, wherein the transport link is selected based at least in part on the upcoming change in connectivity and the communication requirement; and
communicate data of the application with the network using the transport link.

2. The apparatus of claim 1, wherein the transport link is further selected based at least in part on battery state of the accessory wireless device.

3. The apparatus of claim 1, wherein the transport link is selected based at least in part on the availability of one or more direct links between the accessory wireless device and a network.

4. The apparatus of claim 1, wherein the one or more processors are further configured to cause the accessory wireless device to:
measure a quality of the short range link with the companion wireless device, wherein the transport link is selected based at least in part on the quality of the short range link.

5. The apparatus of claim 4, wherein a first transport link of the at least two potential transport links includes the short range link with the companion wireless device and the communication link, wherein a second transport link of the at least two potential transport links does not include the short range link with the companion wireless device and does not include the communication link, wherein the second transport link is selected based on the quality of the short range link.

6. The apparatus of claim 1, wherein the transport link is selected based at least in part on a comparison of energy use per throughput ratio of the at least two potential transport links.

7. The apparatus of claim 1, wherein the transport link is selected based at least in part on at least one user setting.

8. The apparatus of claim 1, wherein the upcoming change in connectivity of the communication link between the companion wireless device and the network is based on a link quality of the communication link.

9. A method for operating a companion wireless device, the method comprising:
communicating with a network using a first link according to a first radio access technology (RAT);
communicating with an accessory device using a second link according to a second RAT;
monitoring a link quality metric for the first link;
detecting a first event concerning a connectivity status of the companion wireless device and the network based on monitoring the link quality metric; and
transmitting assistance information to the accessory device, wherein the assistance information is based at least in part on the first event, wherein the assistance information is useable to select a transport link from a plurality of potential transport links.

10. The method of claim 9, wherein the first RAT is a cellular RAT, wherein the first event comprises the companion wireless device entering or exiting a full service state with regard to the network.

11. The method of claim 9, wherein the first RAT is a cellular RAT, wherein the first event comprises the companion wireless device entering or exiting a state that curtails background traffic over the network.

12. The method of claim 9, wherein the first RAT is a wireless local area network (WLAN) RAT, wherein the link quality metric is a packet loss rate.

13. An apparatus, comprising:
one or more processors, wherein the one or more processors are configured to cause a companion wireless device to:
establish a short range link with an accessory wireless device;

establish a remote link with a network;
monitor a link quality metric associated with the remote link;
detect a first event related to the remote link with the network based on the link quality metric, wherein the first event impacts connectivity of the accessory wireless device with the network via the companion wireless device; and
transmit assistance information to the accessory wireless device, wherein the assistance information is based at least in part on the first event, wherein the assistance information is useable to select a transport link from a plurality of potential transport links.

14. The apparatus of claim 13, wherein the one or more processors are further configured to cause the companion wireless device to:
exchange data with the accessory wireless device via the short range link, wherein at least some data is exchanged prior to the detection of the first event.

15. The apparatus of claim 13, wherein the assistance information comprises a data rate available to the accessory wireless device via the remote link subsequent to the first event.

16. The apparatus of claim 13, wherein the assistance information comprises a time of the first event.

17. The apparatus of claim 13, wherein the assistance information comprises a response of the companion wireless device to the first event.

18. The apparatus of claim 13, wherein the one or more processors are further configured to cause the companion wireless device to:
detect a second event, wherein the assistance information is further based on the second event, wherein the second event impacts connectivity of the accessory wireless device with the network via the companion wireless device.

19. An apparatus, comprising:
one or more processors, wherein the one or more processors are configured to cause an accessory wireless device to:
establish a first short range link with a companion wireless device;
determine at least one of:
whether at least one foreground application is executing on the accessory wireless device; and
a proximity of the accessory wireless device to a user of the accessory wireless device;
evaluate a first criterion for the first short range link, wherein the first criterion comprises an exit criterion indicating that the first short range link is not preferred if the exit criterion is satisfied, wherein the evaluation of the first criterion comprises a determination that the exit criterion is satisfied;
evaluate a second criterion for an alternative short range link with the companion wireless device, wherein the second criterion comprises an entry criterion indicating that the alternative short range link is preferred if the entry criterion is satisfied, wherein the second criterion is based on one or more measurements of quality of the alternative short range link, wherein the evaluation of the first and second criteria is performed in a manner that sets relative priorities of performance and energy use based at least in part on the determination; and
based on the evaluation of the first and second criteria, use the first short range link for communication with the companion wireless device.

20. The apparatus of claim 19, wherein the one or more processors are further configured to cause the accessory wireless device to:
determine whether a timer has expired, wherein said using the first short range link is further based at least in part on a determination of whether the timer has expired.

21. The apparatus of claim 19,
wherein the evaluation of the second criterion comprises a determination that the entry criterion is not satisfied.

22. The apparatus of claim 19,
wherein said using the first short range link is further based on availability of at least one of the first short range link or the alternative short range link.

23. The apparatus of claim 19, wherein the proximity of the accessory wireless device to the user is based on a determination of whether the accessory wireless device is being worn.

24. The apparatus of claim 19, wherein the alternative short range link operates according to Bluetooth, wherein the entry criterion includes a packet error rate.

* * * * *